US007049056B2

(12) United States Patent
Oyamada et al.

(10) Patent No.: US 7,049,056 B2

(45) Date of Patent: May 23, 2006

(54) METHOD FOR WRAPPING HEAT-DEVELOPABLE PHOTOSENSITIVE MATERIAL

(75) Inventors: Takayoshi Oyamada, Kanagawa (JP); Yasuhiro Yoshioka, Kanagawa (JP); Eiichi Okutsu, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/359,189

(22) Filed: Feb. 6, 2003

(65) Prior Publication Data

US 2003/0190567 A1 Oct. 9, 2003

(30) Foreign Application Priority Data

Feb. 6, 2002 (JP) .......................... P.2002-029592

(51) Int. Cl.

*G03C 1/498* (2006.01)

*B64D 65/00* (2006.01)

(52) U.S. Cl. ....................... 430/619; 430/531; 206/578

(58) Field of Classification Search ................ 430/531, 430/619; 206/578

See application file for complete search history.

(56) References Cited

U.S. PATENT DOCUMENTS

| | | | | |
|---|---|---|---|---|
| 4,629,640 | A * | 12/1986 | Akao | 428/35.3 |
| 5,529,413 | A * | 6/1996 | Kamikubota et al. | 400/582 |
| 5,705,324 | A * | 1/1998 | Murray | 430/619 |
| 6,156,491 | A * | 12/2000 | Goto | 430/619 |

FOREIGN PATENT DOCUMENTS

JP 08-334867 * 12/1996

* cited by examiner

*Primary Examiner*—Thorl Chea

(74) *Attorney, Agent, or Firm*—Sughrue Mion, PLLC

(57) ABSTRACT

A method for wrapping a heat-developable photosensitive material, which comprises bending a wrapping material so that the wrapping material can bring into direct contact with at least a part of a heat-developable photosensitive material comprising a photosensitive silver halide, a reducing agent, a binder and a non-photosensitive organic silver salt having a silver behenate content of not lower than 53 mol % provided on one side of a support, wherein the wrapping material is a paper.

5 Claims, 2 Drawing Sheets

METHOD FOR WRAPPING HEAT-DEVELOPABLE PHOTOSENSITIVE MATERIAL

FIELD OF THE INVENTION

The present invention relates to a heat-developable photosensitive material and a material and method for wrapping the heat-developable photosensitive material and more particularly to a wrapping material and method which can provide a heat-developable photosensitive material excellent in handleability in apparatus, preservability and image preservability after heat development.

BACKGROUND OF THE INVENTION

In recent years, the industry of medical diagnostic film and photographic plate-making film has been in great need of reduction of amount of waste liquid from processing from the standpoint of environmental protection and space saving. This has made it necessary to develop a technique for heat-developable photosensitive material as a medical diagnostic film and photographic plate-making film which can be efficiently exposed using a laser image setter or laser imager to form a clear black image having a high resolution and sharpness. The use of such a heat-developable photosensitive material makes it possible to eliminate the necessity of solution-based processing chemicals and hence provide customers with a simpler heat-development system that doesn't damage environment.

Although the art of ordinary image-forming materials has similar requirements, in particular, medical diagnostic images must be finely drawn and hence need a high quality such as high sharpness and graininess. Further, images having cold black tone are desirable from the standpoint of ease of diagnosis. At present, various hard copy systems utilizing pigment and dye such as ink jet printer and electrophotography have been on the market as ordinary image forming systems. However, none of these image forming systems are satisfactory as medical image outputting systems.

On the other hand, a heat image forming system using an organic silver salt is disclosed in U.S. Pat. Nos. 3,152,904 and 3,457,075, and D. Klosterboer, "Thermally Processed Silver Systems", Imaging Processes and Materials, Neblette, 8th edition, compiled by J. Sturge, V. Walworth, and A. Shepp, Chapter 9, page 279 (1989).

In particular, a heat-developable photosensitive material normally comprises a photosensitive layer having a catalytically active amount of a photocatalyst (e.g., silver halide), a reducing agent, a reducible silver salt (e.g., organic silver salt) and optionally a toning agent for controlling the tone of silver dispersed in a binder matrix.

The heat-developable photosensitive material which has been imagewise exposed to light is then heated to a high temperature (e.g., 80° C. or higher) so that the reducible silver salt (which acts as an oxidizing agent) undergoes redox reaction with the reducing agent to form a black silver image. The redox reaction is accelerated by the catalytic action of the latent image of silver halide produced by exposure. Therefore, the black silver image is formed on the exposed area. For the details of this mechanism, reference can be made to many literatures, including U.S. Pat. No. 2,910,377 and JP-B-43-4924 (the term "JP-B" as used herein means an "examined Japanese patent publication").

It has been keenly desired to further develop the aforementioned environmentally friendly heat-developable photosensitive material having an excellent handleability, preservability and image preservability after heat development and a wrapping material and a wrapping method therefor.

A heat-developable photosensitive material comprising an organic silver salt undergoes no fixing of organic silver salt and other materials and thus can likely have a silver image to appear when acted upon light or heat even after the formation of silver image by heat. It is a matter of course that such a trouble does not occur under ordinary working conditions. However, when the film processed is stored under very severe conditions for heat-developable photosensitive material, e.g., when the film is kept in a car in summer season for transporting purpose or like purposes, the film undergoes troubles such as entire discoloration and transfer of letters on the bag in which the film is wrapped to the film, i.e., fog.

When the heat-developable photosensitive material is subjected to development after stored in the form of wrapped sheet film, it can undergo density change under the influence of the wrapping material.

In order to inhibit the change with time during the storage in the form of wrapped film, a wrapping material comprising a polypropylene or polyethylene sheet has been proposed. These synthetic resin sheets are disadvantageous in that they have so high a chargeability as to attract dust in the air, which adhere on the heat-developable photosensitive material, thereby causing white spot (WS). A wrapping material comprising an aluminum foil laminated thereon has been proposed as another wrapping material. However, this wrapping material cannot be recycled as used paper. Further, even when combusted, this wrapping material leaves the aluminum foil incompletely combusted. This aluminum foil is then accumulated in the incinerator. Accordingly, this wrapping material is undesirable from the standpoint of environmental protection.

SUMMARY OF THE INVENTION

It is therefore an object of the invention to provide a wrapping material which can prevent a heat-developable photosensitive material having a good image preservability after heat-development from showing a density change during storage in a wrapped form and exhibits a good handleability in apparatus and a good recyclability and a wrapping method using the same.

Other objects of the invention will become apparent from the following detailed description and examples.

The inventors made extensive studies of solution to the aforementioned problems. As a result, it was found that the aforementioned object of the invention is accomplished by the following items of the invention.

(1) A method for wrapping a heat-developable photosensitive material, which comprises bending a wrapping material so that the wrapping material can bring into direct contact with at least a part of a heat-developable photosensitive material comprising a photosensitive silver halide, a reducing agent, a binder and a non-photosensitive organic silver salt having a silver behenate content of not lower than 53 mol % provided on one side of a support, wherein the wrapping material is a paper.

(2) The method for wrapping a heat-developable photosensitive material according to item (1), wherein the paper is paper made from a virgin pulp.

(3) The method for wrapping a heat-developable photosensitive material according to item (1) or (2), wherein the paper comprises a laminate layer formed from a material other than paper provided on at least one side thereof.

(4) The method for wrapping a heat-developable photosensitive material according to any one of items (1) to (3), wherein the paper comprises a protective layer comprising an ultraviolet-curing resin provided on the surface thereof coming into contact with the heat-developable photosensitive material.

(5) The method for wrapping a heat-developable photosensitive material according to any one of items (1) to (4), wherein the binder comprises polyvinyl butyral in an amount of from 50 to 100% by weight.

(6) The method for wrapping a heat-developable photosensitive material according to any one of items (1) to (5), wherein said binder has a glass transition temperature (Tg) of from 40 to 90° C.

(7) A heat-developable photosensitive material wrapped with the wrapping method according to any one of items (1) to (6).

Figure 1A:
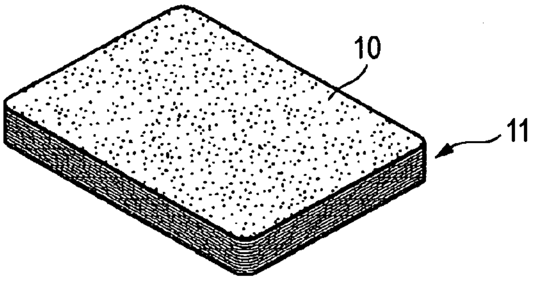
FIG. 1A is a schematic view illustrating a laminated heat-developable photosensitive material.

In the figures, the reference numeral 1 indicates a protective carrier, the reference numeral 2 indicates a bottom surface, the reference numeral 3 indicates a connecting portion, the reference numeral 4 indicates a top surface, the reference numeral 5 indicates a half cut (folding line), the reference numerals 6*a* and 6*b* each indicate a flap, the reference numeral 7 indicates a notch, the reference numeral 10 indicates a heat-developable photosensitive material, the reference numeral 11 indicates a laminated heat-developable photosensitive material (film), the reference numeral 12 indicates an inner wrapping bag, the reference numeral 13 indicates a heat developing machine, the reference numeral 14 indicates a cassette, the reference numeral 15 indicates a heat seal, the reference numeral 16 indicates an OP varnish-free zone, and the reference numeral 17 indicates a UV-curing OP varnish.

DETAILED DESCRIPTION OF THE INVENTION

The invention will be described in detail hereinafter.

The heat-developable photosensitive material of the invention comprises an organic silver salt incorporated therein. The organic silver salt employable herein is a silver salt which is relatively stable to light but forms a silver image when heated to a temperature of not lower than 80° C. in the presence of a photocatalyst which has been exposed to light (e.g., latent image of photosensitive silver halide) and a reducing agent. The organic silver salt may be an arbitrary organic material containing a source capable of reducing silver ion but essentially contains silver behenate in an amount of not lower than 53 mol %, particularly from 60 to 98 mol %. Other preferred examples of the silver salt of organic acid include silver salt of long-chain aliphatic carboxylic acid having from 10 to 30, preferably from 15 to 28 carbon atoms. Also preferred are complexes of organic or inorganic silver salt the ligand of which has a complex stability constant of from 4.0 to 10.0. For the details of these non-photosensitive organic silver salts, reference can be made to JP-A-10-62899 (paragraph [0048]–[0049]) (the term “JP-A” as used herein means an “unexamined published Japanese patent application”), European Patent Laid-Open No. 0803764A1 (line 24, page 18-line 37, page 19), European Patent Laid-Open No. 0962812A1, JP-A-11-349591, JP-A-2000-7683, JP-A-2000-72711, etc. Preferred examples of organic silver salts include silver salts of organic compound having carboxyl group. These examples include silver salts of aliphatic carboxylic acid and silver salts of aromatic carboxylic acid, but the invention should not be limited thereto. Preferred examples of the silver salts of aliphatic carboxylic acid besides the aforementioned silver behenate include silver arachidate, silver stearate, silver oleate, silver laurate, silver caproate, silver myristate, silver palmitate, silver maleate, silver fumarate, silver tartrate, silver linoleate, silver butyrate, silver camphorate, and mixture thereof. The organic silver salt which is a silver supplier may preferably constitute from about 5 to 30% by weight of the image-forming layer.

The crystal form of the organic silver salt employable herein is not specifically limited and may be cube, rectangular parallelopiped, rod, needle, tablet or scale. Relatively preferred among these crystal forms are cube, rectangular parallelopiped, rod and needle. Cubic, rectangular, rod-like or acicular organic silver salts can be defined as follows. In some detail, the organic silver salt is observed under electron microscope. The crystal form of the organic silver salt particle is then approximated to rectangular parallelopiped. The sides of the rectangular parallelopiped are then defined to be a, b and c in order of length ($a \leqq b \leqq c$).

The cube is defined to be a particle having the relationship: $0.9 \leqq a/c \leqq 1.0$. The rectangular particle is defined to be a particle having the relationship: $0.2 \leqq a/c < 0.9$ and $0.2 \leqq b/c < 1.0$. The rod-like particle is defined to be a particle having the relationship: $0.1 \leqq a/c < 0.2$ and $0.1 \leqq b/c < 0.3$. The acicular particle is defined to be a particle having the relationship: $a/c < 0.1$ and $b/c < 0.1$. Preferred among these crystal forms of organic silver salt are needle and rod, particularly needle.

The organic silver salt employable herein can be prepared by forming particles in an aqueous solvent, drying the particles, and then dispersing the particles in a solvent such as methyl ethyl ketone. Drying is preferably effected at an oxygen partial pressure of from 0.01 to 15 vol %, more preferably from 0.01 to 10 vol % in an airflow flash jet dryer.

The organic silver salt may be used in a desired amount, preferably from 0.1 to 5 g/$m^2$, more preferably from 1 to 3 g/$m^2$ as calculated in terms of coated amount of silver.

The heat-developable photosensitive material of the invention comprises a photosensitive silver halide. The method for forming the photosensitive silver halide to be used in the invention is well known in the art. For example, methods disclosed in “Research Disclosure”, No. 17029 (June, 1978) and U.S. Pat. No. 3,700,458 may be employed. Specific examples of the preparation method employable herein include a method which comprises adding a halogen-containing compound to an organic silver salt which has been prepared to convert some silver atoms in the organic silver salt to photosensitive silver halide and a method which comprises adding a silver-supplying compound and a halogen-supplying compound to a solution of gelatin or other polymer to prepare a particulate photosensitive silver halide which is then mixed with an organic silver salt. In the invention, the latter method is preferably employed. The particle size of the photosensitive silver halide is preferably as small as possible for the purpose of minimizing turbidity after the image formation. In some detail, the particle size of the photosensitive silver halide is preferably from 0.0001 to 0.15 μm, more preferably from 0.02 to 0.10 μm. When the particle size of the silver halide is too small, the resulting photosensitive material lacks sensitivity. On the contrary, when the particle size of the silver halide is too great, the resulting photosensitive material may have a raised haze. The term "particle size" as used herein means the length of the side of the silver halide particle when it is a so-called normal crystal such as cube and octahedron or the diameter of the circle having the same area as the projected area of the main plane of the silver halide particle when it is tabular. The particle size of the silver halide particle which is not a normal crystal, e.g., is spherical, rod-like or the like is defined to be the diameter of the sphere having the same volume as the silver halide particle.

Examples of the crystal form of the silver halide particle include cube, octahedron, tablet, sphere, rod, and potato-like grain. Particularly preferred among these crystal forms are cube and tablet. The average aspect ratio of the tabular silver halide particle is preferably from 100:1 to 2:1, more preferably from 50:1 to 3:1. Further, silver halide particles of rounded corners are preferably used. The face index (Miller index) of the external surface of the photosensitive silver halide particle is not specifically limited. However, the proportion of {100} plane, which has a high spectral sensitization efficiency when a spectral sensitizing dye is adsorbed, is preferably high. The proportion of {100} plane is preferably not lower than 50%, more preferably not lower than 65%, still more preferably not lower than 80%. The aforementioned Miller index, i.e., proportion of {100} plane can be determined by the method disclosed in T. Tani, "J. Imaging Sci.", 29, 165, (1985), which involves the utilization of adsorption dependence of {111} plane and {100} plane in the adsorption of sensitizing dye. The halogen composition of the photosensitive silver halide is not specifically limited and may be any of silver chloride, silver chlorobromide, silver bromide, silver iodobromide, silver iodochlorobromide and silver iodide. In the invention, silver bromide or silver iodobromide is preferred, particularly silver iodobromide. The silver iodide content of the photosensitive silver halide is preferably from 0.1 to 40 mol %, more preferably from 0.1 to 20 mol-%. The distribution of halogen in the particle may be uniform. Alternatively, the halogen composition may change stepwise or continuously. In a preferred embodiment, a silver iodobromide particle having a high inner silver iodide content is used. Another preferred embodiment employable herein is a silver halide particle having a core/shell structure. The structure of the core/shell particle is preferably double to fivefold, more preferably double to fourfold.

The photosensitive silver halide particle to be used herein preferably contains at least one complex of metal selected from the group consisting of rhodium, rhenium, ruthenium, osmium, iridium, cobalt, mercury and iron. These metal complexes may be used singly. Alternatively, two or more of the same or different kinds of metal complexes may be used in combination. The content of these metal complexes in the photosensitive silver halide particle is preferably from 1 nanomol (nmol) to 10 millimol (mmol), more preferably from 10 nanomol (mmol) to 100 micromol (μmol) per mol of silver. Referring further to the structure of metal complex, metal complexes having the structure disclosed in JP-A-7-225449 can be used. Preferred examples of cobalt and iron compounds include hexacyano metal complexes. Specific examples of these hexacyano metal complexes include ferricyanate ion, ferrocyanate ion, and hexacyanocobaltate ion, but the invention should not be limited thereto. The metal complex-containing phase in the silver halide is not specifically limited. The metal complex may be uniformly contained in the silver halide particle. Alternatively, the metal complex may be contained in the core or shell of the silver halide particle in a high concentration.

The particulate photosensitive silver halide may be desalted by a water washing method known in the art such as noodle method and flocculation method. In the invention, however, the particulate photosensitive silver halide may or may not be desalted.

The particulate photosensitive silver halide of the invention is preferably subjected to chemical sensitization. As chemical sensitization method there is preferably employed sulfur sensitization method, selenium sensitization method or tellurium sensitization method as well known in the art. Alternatively, a noble metal sensitization method using a gold compound, platinum compound, palladium compound, iridium compound or the like or a reduction sensitization method may be employed. Examples of the compounds which are preferably used in the sulfur sensitization method, selenium sensitization method or tellurium sensitization method there may be used known compounds. In particular, compounds disclosed in JP-A-7-128768 may be used.

The amount of the photosensitive silver halide to be used in the invention is preferably from 0.01 to 0.5 mols, more preferably from 0.02 to 0.3 mols, particularly from 0.03 to 0.25 mols per mol of organic silver salt. Examples of method for mixing the photosensitive silver halide and the organic silver salt which have been separately prepared include a method which comprises mixing a particulate silver halide and an organic silver salt which have been separately prepared in a high speed agitator, ball mill, sand mill, colloid mill, vibration mill, homogenizer or the like, and a method which comprises mixing an organic silver salt with a photosensitive silver halide which has been prepared at any time during the preparation of the organic silver salt to prepare the desired organic silver salt. However, the method for mixing the photosensitive silver halide and the organic silver salt is not specifically limited so far as the effect of the invention can be thoroughly exerted.

As the method for preparing the silver halide to be used herein there is preferably used a so-called halidation method involving the halogenation of some silver atoms in an organic silver salt by an organic or inorganic halide. As the organic halide to be used herein there may be used any compound which reacts with an organic silver salt to produce a silver halide. Examples of such an organic halide include N-halogenoimide (e.g., N-bromosuccinimide), halogenated quaternary nitrogen compound (e.g., tetrabutyl ammonium bromide), and association product of halogenated quaternary nitrogen salt and halogen molecule (e.g., pyridinium perbromide). As the inorganic halide there may be used any compound which reacts with an organic silver salt to produce a silver halide. Examples of such a compound include halogenated alkali metal or ammonium (e.g., sodium chloride, lithium bromide, potassium iodide, ammonium bromide), halogenated alkaline earth metal (e.g., calcium bromide, magnesium chloride), halogenated transition metal (e.g., ferric chloride, cupric bromide), metal complex having halogen ligands (e.g., sodium bromoiridate, ammonium chlororhodate), and halogen molecule (e.g., bromine, chlorine, iodine). Alternatively, the organic and inorganic halides may be used together, if desired. The added amount of the halide to be used in halidation is preferably from 1 to 500 millimol, more preferably from 10 to 250 millimol per mol of organic silver salt.

As the sensitizing dye to be used in the invention there may be used to advantage a sensitizing dye which can spectrally sensitize the particulate silver halide within a desired wavelength range when adsorbed to the particulate silver halide and has a spectral sensitivity suitable for the spectral properties of the exposing light source. For the details of the sensitizing dye and the method for adding the sensitizing dye, reference can be made to JP-A-11-65021 (paragraphs [0103]–[0109]), compounds represented by formula (II) in JP-A-10-186572, dyes represented by formula (I) and paragraph [0106] in JP-A-11-119374, dyes disclosed in U.S. Pat. Nos. 5,510,236, 5,541,054 and Example 5 of U.S. Pat. No 3,871,887, dyes disclosed in JP-A-2-96131 and JP-A-59-48753, European Patent Laid-Open No. 0803764A1, line 38, page 19—line 35, page 20, JP-A-2001-272747, JP-A-2001-290238, etc. These sensitizing dyes may be used singly or in combination of two or more thereof.

The amount of the sensitizing dye to be used herein can be predetermined to be a desired value depending on the properties such as sensitivity and fog but is preferably from $10^{-6}$ to 1 mol, more preferably from $10^{-4}$ to $10^{-1}$ mol per mol of silver halide in the photosensitive layer.

The emulsion may comprise a dye which has no spectral sensitizing effect itself or a material which doesn't substantially absorb visible light but exhibits supersensitizing effect in combination with the sensitizing dye particularly for the supersensitizing purpose. For the details of combination of useful sensitizing dye and supersensitizing dye and supersensitizing material, reference can be made to "Research Disclosure", Vol. 176, No. 17643, IV-J, page 23 (December 1978), JP-B-49-25500, JP-B-43-4933, JP-A-59-19032, JP-A-59-192242, etc.

The heat-developable photosensitive material of the invention preferably comprises a toning agent incorporated therein. For the details of toning agents, reference can be made to JP-A-10-62899 (paragraphs [0054]–[0055]), European Patent Laid-Open No. 0803764A1, lines 23–48, page 21, and JP-A-2000-35631 (corresponding to Japanese Patent Application No. 10-213487). Particularly preferred among these toning agents are phthaladinones, phthaladine, phthaladinone derivatives or metal salts such as 4-(1-naphthyl)phthaladinone, 6-chlorophthaladinone, 5,7-dimethoxyphthaladinone and 2,3-dihydro-1,4-phthaladinedione, combination of phthaladinones and phthalic acids (e.g., phthalic acid, 4-methylphthalic acid, 4-nitrophthalic acid, tetrachlorophthalic anhydride), phthaladines (phthaladine, phthaladine derivative or metal salt such as 4-(1-naphthyl) phthaladine, 6-isopropylphthaladine, 6-tert-butylphthaladine, 6-chlorophthaladine, 5,7-dimethoxyphthaladine and 2,3-dihydrophthaladine), and combination of phthaladines and phthalicacids. In particular, the combination of phthaladines and phthalic acids is preferred. The toning agent is preferably incorporated in the heat-developable photosensitive material on the image-forming layer side thereof in an amount of from 0.1 to 50 mol %, more preferably from 0.5 to 20 mol %.

The heat-developable photosensitive material of the invention contains a reducing agent for the organic silver salt. The reducing agent for the organic silver salt may be an arbitrary material (preferably organic material) capable of reducing silver ion to metallic silver. For the details of such a reducing agent, reference can be made to JP-A-11-65021 (paragraphs [0043]–[0045]), and European Patent Laid-Open No. 0803764A1, line 34, page 7—line 12, page 18.

In the invention, as the reducing agent there is preferably used a hindered phenol reducing agent or bisphenol reducing agent, more preferably a compound represented by the following general formula (R):

(R)

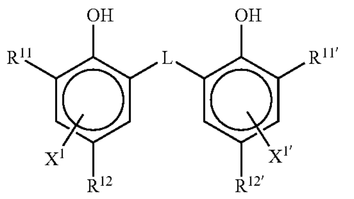

wherein $R^{11}$ and $R^{11'}$ each independently represent a $C_1$–$C_{20}$ alkyl group; $R^{12}$ and $R^{12'}$ each independently represent a hydrogen atom or a substituent which can substitute on the benzene ring; L represents a —S— group or —$CHR^{13}$— group; $R^{13}$ represents a hydrogen atom or $C_1$–$C_{20}$ alkyl group; and $X^1$ and $X^{1'}$ each independently represent a hydrogen atom or a substituent which can substitute on the benzene ring.

The general formula (R) will be further described hereinafter.

$R^{11}$ and $R^{11'}$ each independently represent a substituted or unsubstituted $C_1$–$C_{20}$ alkyl group. The substituent on the substituted alkyl group is not specifically limited and preferably an aryl group, hydroxyl group, alkoxy group, aryloxy group, alkylthio group, arylthio group, acylamino group, sulfonamido group, sulfonyl group, phosphoryl group, acyl group, carbamoyl group, ester group, halogen atom or the like.

$R^{12}$ and $R^{12'}$ each independently represent a hydrogen atom or a substituent which can substitute on the benzene ring. $X^1$ and $X^{1'}$ each independently represent a hydrogen atom or a substituent which can substitute on the benzene ring. Preferred examples of the group which can substitute on benzene ring include alkyl group, aryl group, halogen atom, alkoxy group, acylamino group, etc.

L represents a —S— group or —$CHR^{13}$— group. $R^{13}$ represents a hydrogen atom or $C_1$–$C_{20}$ alkyl group which may have a substituent. Specific examples of the unsubstituted alkyl group represented by $R^{13}$ include methyl group, ethyl group, propyl group, heptyl group, undecyl group, isopropyl group, 1-ethylpentyl group, and 2,4,4-trimethylpentyl group. Examples of the substituent on the substituted alkyl group include those listed with reference to $R^{11}$, i.e., halogen atom, alkoxy group, alkylthio group, aryloxy group, arylthio group, acylamino group, sulfonamido group, sulfonyl group, phosphoryl group, oxycarbonyl group, carbamoyl group, and sulfamoyl group.

$R^{11}$ and $R^{11'}$ each are preferably a $C_3$–$C_{15}$ secondary or tertiary alkyl group. Specific examples of such a $C_3$–$C_{15}$ secondary or tertiary alkyl group include isopropyl group, isobutyl group, tert-butyl group, tert-amyl group, tert-octyl group, cyclohexyl group, cyclopentyl group, 1-methylcyclohexyl group, and 1-methylcyclopropyl group. More preferably, $R^{11}$ and $R^{11'}$ each are a $C_4$–$C_{12}$ tertiary alkyl group. Preferred among these $C_4$–$C_{12}$ tertiary alkyl groups are t-butyl group, t-amyl group, and 1-methylcyclohexyl groups. Mostly preferred among these groups is tert-butyl group.

$R^{12}$ and $R^{12'}$ each are preferably a $C_1$–$C_{20}$ alkyl group. Specific examples of such a $C_1$–$C_{20}$ alkyl group include methyl group, ethyl group, propyl group, isopropyl group, t-butyl group, t-amyl group, cyclohexyl group, 1-methylcyclohexyl group, benzyl group, methoxymethyl group, and methoxyethyl group. Preferred among these alkyl groups are methyl group, ethyl group, propyl group, isopropyl group, tert-butyl group.

$X^1$ and $X^{1'}$ each preferably represent a hydrogen atom, halogen atom or alkyl group, more preferably hydrogen atom.

L is preferably a —$CHR^{13}$— group.

$R^{13}$ is preferably a hydrogen atom or a $C_1$–$C_{15}$ alkyl group. Preferred examples of such an alkyl group include methyl group, ethyl group, isopropyl group, and 2,4,4-trimethylphentyl groups. Particularly preferred among these groups represented by $R^{13}$ are hydrogen atom, methyl group, propyl group, and isopropyl group.

When $R^{13}$ is a hydrogen atom, $R^{12}$ and $R^{12'}$ each are preferably a $C_2$–$C_5$ alkyl group, more preferably ethyl group or propyl group, most preferably ethyl group.

When $R^{13}$ is a $C_1$–$C_8$ primary or secondary alkyl group, $R^{12}$ and $R^{12'}$ each are preferably a methyl group. The $C_1$–$C_8$ primary or secondary alkyl group represented by $R^{13}$ is more preferably a methyl group, ethyl group, propyl group or isopropyl group, even more preferably methyl group, ethyl group or propyl group.

When $R^{11}$, $R^{11'}$, $R^{12}$ and $R^{12'}$ all are methyl groups, $R^{13}$ is preferably a secondary alkyl group. In this case, the secondary alkyl group represented by $R^{13}$ is preferably an isopropyl group, isobutyl group or 1-ethylpentyl group, more preferably isopropyl group.

Specific examples of the reducing agent of the invention, including the compound represented by formula (R) of the invention, will be given below, but the invention should not be limited thereto.

(R-1)

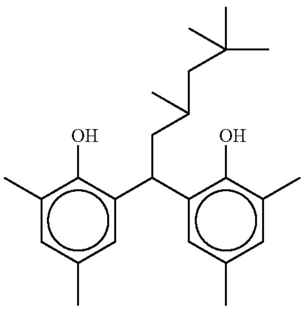

(R-2)

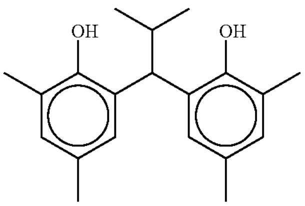

(R-3)

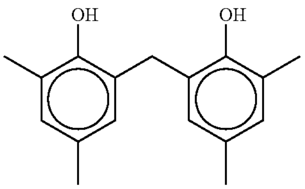

-continued (R-4)

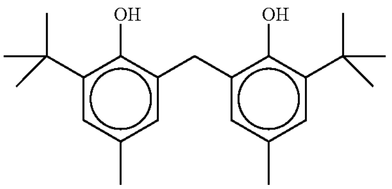

(R-5)

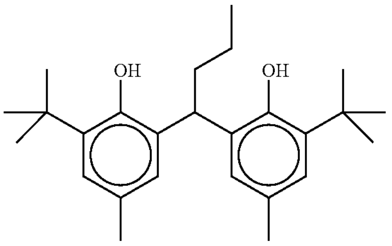

(R-6)

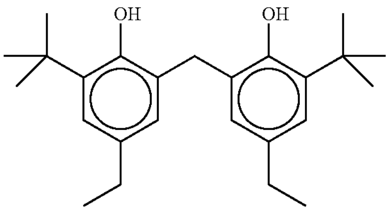

(R-7)

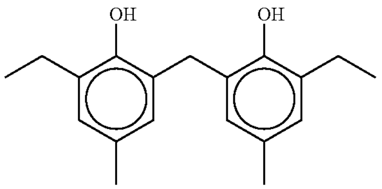

(R-8)

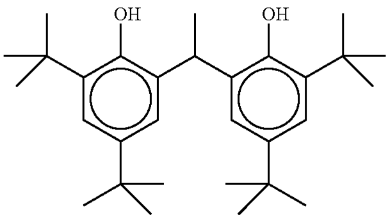

(R-9)

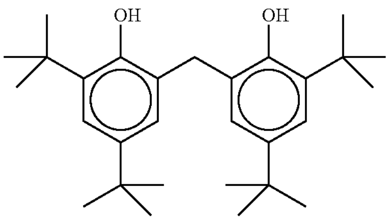

(R-10)

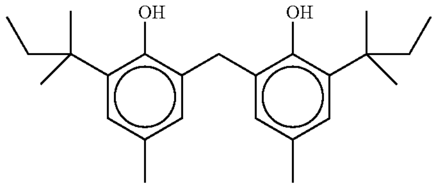

-continued
(R-11)
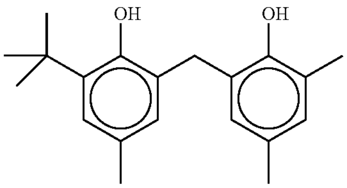
(R-12)
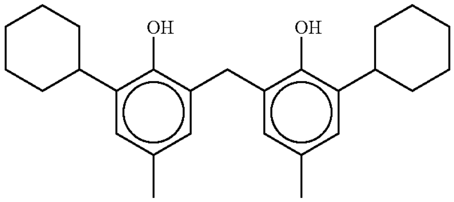
(R-13)
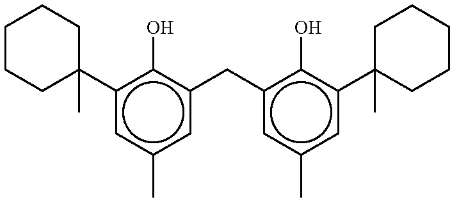
(R-14)
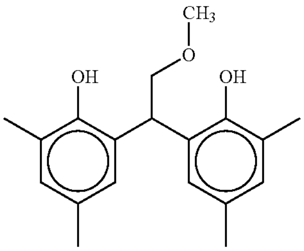
(R-15)
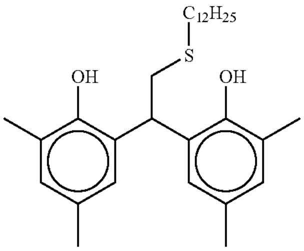
(R-16)
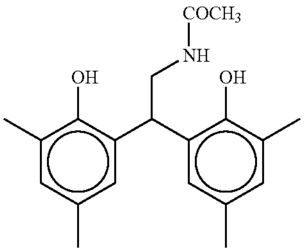
(R-17)
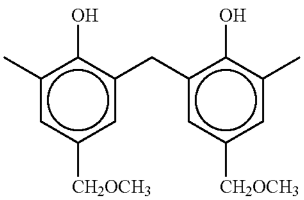
-continued
(R-18)
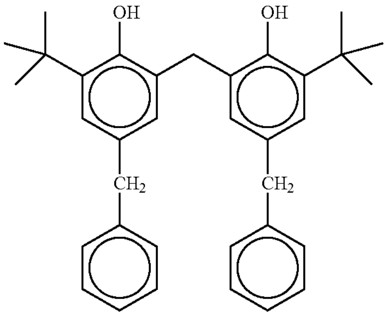
(R-19)
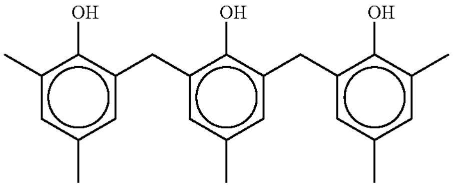
(R-20)
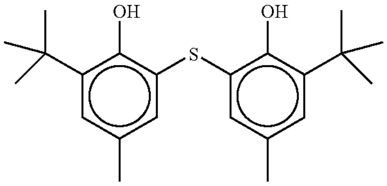
(R-21)
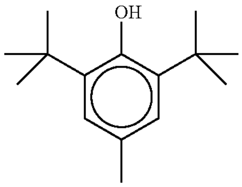
(R-22)
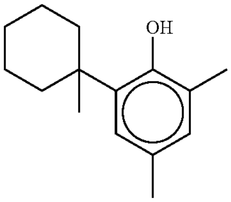
(R-23)
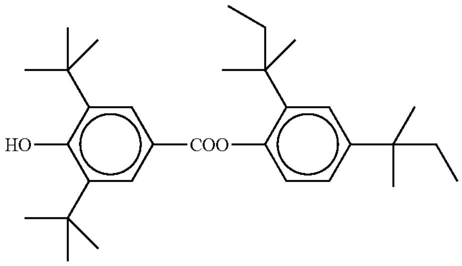
(R-24)
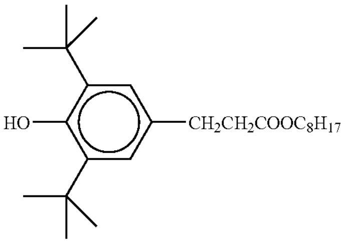

-continued (R-25)

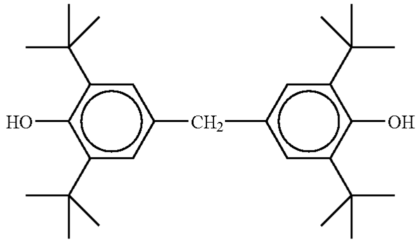

(R-26)

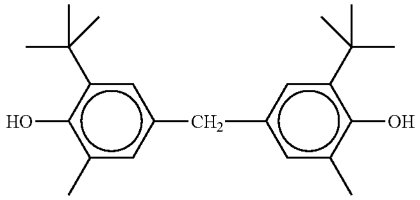

(R-27)

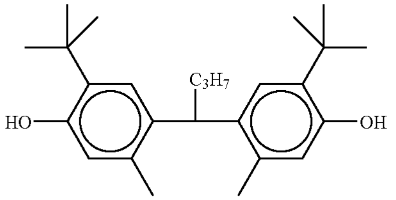

In the invention, the added amount of the reducing agent is preferably from 0.01 to 5.0 g/$m^2$, more preferably from 0.1 to 3.0 g/$m^2$. The reducing agent is preferably incorporated in an amount of from 5 to 50 mol %, more preferably from 10 to 40 mol % per mol of silver incorporated on the side having the image-forming layer. The reducing agent is preferably incorporated in the image-forming layer.

The reducing agent may be incorporated in the coating solution in any form such as solution, emulsion dispersion and solid fine particle dispersion before being incorporated in the photosensitive material.

Well known examples of emulsion dispersion method include a method which comprises dissolving the reducing agent in an oil such as dibutyl phthalate, tricresyl phosphate, glyceryl triacetate and diethyl phthalate and an auxiliary solvent such as ethyl acetate and cyclohexanone, and then subjecting the solution to mechanical dispersion to prepare an emulsion dispersion.

Examples of the solid fine particle dispersion method include a method which comprises subjecting the reducing agent powder to dispersion in an appropriate solvent such as water using a ball mill, colloid mill, vibration mill, sand mill, jet mill or roller mill or by ultrasonic wave to prepare a solid dispersion. During this procedure, a protective colloid (e.g., polyvinyl alcohol) and a surface active agent (e.g., anionic surface active agent such as sodium triisopropyl naphthalenesulfonate (mixture of triisopropyl naphthalenesulfonates having different substitution positions of isopropyl groups) may be used. The aqueous dispersion may comprise a preservative (e.g., benzoisothiazolinone sodium salt) incorporated therein.

The heat-developable photosensitive material of the invention preferably comprises as a development accelerator a sulfonamido phenol-based compound represented by formula (A) described in JP-A-2000-267222 and JP-A-2000-330234, a hindered phenol-based compound represented by formula (II) described in JP-A-2001-92075, a hydrazine-based compound represented by formula (I) described in JP-A-10-62895, JP-A-11-15116 and JP-A-2002-278017 or a phenolic or naphtholic compound represented by the general formula (2) described in JP-A-2001-264929 (corresponding to Japanese Patent Application No. 2000-76240) incorporated therein. The development accelerator is used in an amount of from 0.1 to 20 mol %, preferably from 0.5 to 10 mol %, more preferably from 1 to 5 mol % based on the reducing agent. The incorporation of the development accelerator into the photosensitive material can be accomplished by the same method as that for the reducing agent. In particular, the development accelerator is preferably incorporated into the photosensitive material in the form of solid dispersion or emulsion dispersion. When incorporated in the form of emulsion dispersion, the development accelerators are used in the form of emulsion dispersion obtained by dispersion with a high boiling solvent which normally stays solid and a low boiling auxiliary solvent or a so-called oil-free emulsion dispersion obtained free from a high boiling solvent.

Particularly preferred among the aforementioned development accelerators are hydrazine-based compound represented by formula (1) described in JP-A-2002-278017 and phenol-based or naphthol-based compound represented by formula (2) described in JP-A-2001-264929 (corresponding to Japanese Patent Application No. 2000-76240).

Specific preferred examples of the development accelerator of the invention will be given below, but the invention should not be limited thereto.

(A-1)

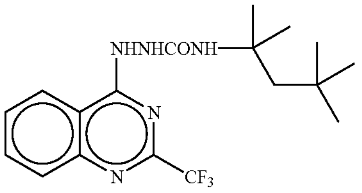

(A-2)

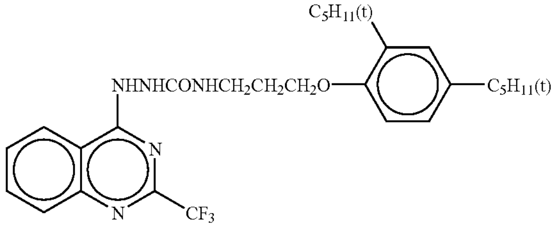

(A-3)

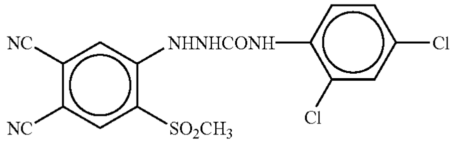

(A-4)

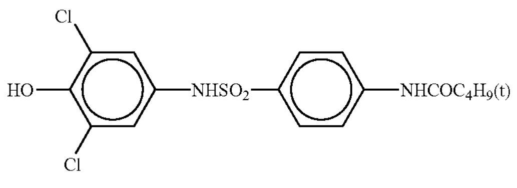

-continued (A-5)

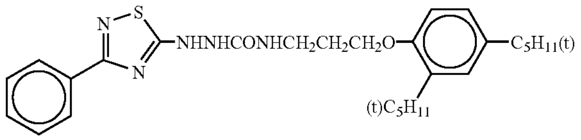

(A-6)

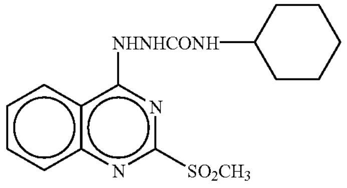

(A-7)

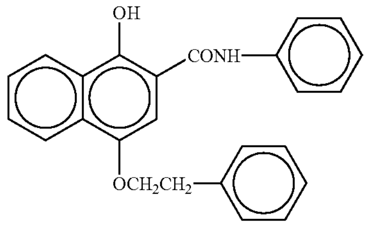

(A-8)

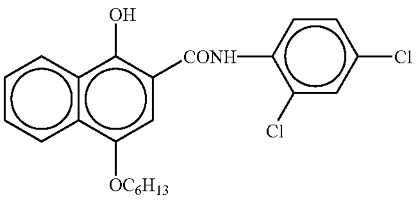

(A-9)

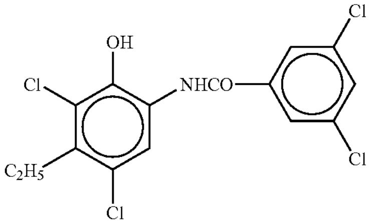

(A-10)

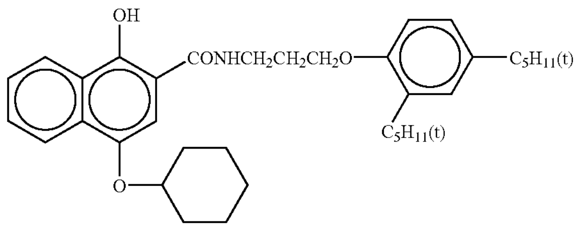

As the binder to be incorporated in the photosensitive layer in the heat-developable photosensitive material of the invention there maybe used a natural or synthetic resin selected, for example, from gelatin, polyvinyl butyral, polyvinyl acetal, polyvinyl chloride, polyvinyl acetate, cellulose acetate, polyolefin, polyester, polystyrene, polyacrylonitrile, polycarbonate, polyvinyl butyral, butyl ethyl cellulose, methacrylate copolymer, maleic anhydride copolymer and butadiene-styrene copolymer. Preferably, polyvinyl butyral is used in an amount of not lower than 50% by weight. It is a matter of course that copolymers and terpolymers may be used as well. The amount of polyvinyl butyral to be used as a binder is preferably from 50% to 100% by weight, more preferably from 70 to 100% by weight. The glass transition temperature (Tg) of the binder in the photosensitive layer is preferably from 40 to 90° C., more preferably from 50 to 80° C.

The total amount of the binder in the photosensitive layer of the invention is such that the binder can sufficiently retain the components therein. In other words, the binder is used in an amount such that it can effectively perform as a binder. The effective range of the amount of the binder can be appropriately determined by those skilled in the art. Referring to the measure of the amount of the binder allowing the retention of at least the organic silver salt, the ratio of binder to organic silver salt by weight is preferably from 15:1 to 1:3, particularly from 8:1 to 1:2.

The silver halide emulsion and/or organic silver salt to be used in the invention can be further protected by a fog inhibitor, a stabilizer and a stabilizer precursor against the additional production of fog to render itself stable to the sensitivity decrease during storage in stock. Examples of the appropriate fog inhibitor, stabilizer and stabilizer precursor which can be used singly or in combination include thiazonium salts disclosed in U.S. Pat. Nos. 2,131,038 and 2,694,716, azaindene disclosed in U.S. Pat. Nos. 2,886,437 and 2,444,605, compounds disclosed in JP-A-9-329865 and U.S. Pat. No. 6,083,681, mercury salts disclosed in U.S. Pat. No. 2,728,663, urazole disclosed in U.S. Pat. No. 3,287,135, sulfocatechol disclosed in U.S. Pat. No. 3,235,652, oxime, nitron and nitroindazole disclosed in British Patent 623,448, polyvalent metal salts disclosed in U.S. Pat. No. 2,839,405, thiuronium salts disclosed in U.S. Pat. No. 3,220,839, palladium, platinum and gold salts disclosed in U.S. Pat. Nos. 2,566,263 and 2,597,915, halogen-substituted organic compounds disclosed in U.S. Pat. Nos. 4,108,665 and 4,442,202, triazine disclosed in U.S. Pat. Nos. 4,128,557, 4,137,079, 4,138,365 and 4,459,350, and phosphorus compounds disclosed in U.S. Pat. No. 4,411,985.

The fog inhibitor which is preferably used in the invention is an organic halogen compound, preferably a polyhalomethyl compound, particularly a trihalomethylsulfone compound. Examples of the organic halogen compound employable herein include those disclosed in JP-A-50-119624, JP-A-50-120328, JP-A-51-121332, JP-A-54-58022, JP-A-56-70543, JP-A-56-99335, JP-A-59-90842, JP-A-61-129642, JP-A-62-129845, JP-A-6-208191, JP-A-7-5621, JP-A-7-2781, JP-A-8-15809, JP-A-9-160167, JP-A-9-244177, JP-A-9-244178, JP-A-9-258367, JP-A-9-265150, JP-A-9-319022, JP-A-10-171063, JP-A-11-212211, JP-A-11-231460, JP-A-11-242304, and U.S. Pat. Nos. 5,340,712, 5,369,000 and 5,464,737. Specific examples of these compounds include 2-(tribromomethylsulfone)quinoline, 2-(tribromomethylsulfone)pyridine, tribromomethylphenylsulfone, and tribromomethylnaphthylsulfone.

A mercury salt (II) may be incorporated in the photosensitive layer as a fog inhibitor to advantage, though being not always necessary for the purpose of the invention. The mercury salt (II) suitable for this purpose is mercury acetate or mercury bromide. The amount of mercury to be used herein is preferably from 1 nanomol (nmol) to 1 millimol (mmol), more preferably from 10 nanomol (nmol) to 100 micromol (μmol) per mol of silver coated.

The heat-developable photosensitive material of the invention may comprise benzoic acids incorporated therein for the purpose of increasing the sensitivity thereof or inhibiting fog. The benzoic acids to be used herein may be any benzoic acid derivatives. Preferred examples of the structure of the benzoic acid derivative include compounds disclosed in U.S. Pat. Nos. 4,784,939 and 4,152,160, JP-A-9-281637, JP-A-9-329864, and JP-A-9-329865. The benzoic acids to be used herein may be added to the photosensitive material in any portion. In practice, however, the benzoic acids are preferably incorporated in the layer on the photosensitive layer side, more preferably in the organic silver salt-containing layer. The benzoic acids may be added at any step during the preparation of the coating solution. When incorporated in the organic silver salt-containing layer, the benzoic acids may be added at any step between the preparation of the organic silver salt and the preparation of the coating solution, preferably between after the preparation of the organic silver salt and immediately before coating. The benzoic acids may be added in any form such as powder, solution and finely particulate dispersion. Alternatively, the benzoic acids may be added in the form of solution mixed with other additives such as sensitizing dye, reducing agent and toning agent. The amount of the benzoic acids to be added is not limited but is preferably from 1 micromol (μmol) to 2 mols, more preferably from 1 millimol (mmol) to 0.5 mols per mol of silver.

The heat-developable photosensitive material of the invention may comprise a mercapto compound, a disulfide compound or a thione compound incorporated therein to inhibit or accelerate development, thereby controlling development, enhance spectral sensitization efficiency or improve preservability before and after development.

The mercapto compound, when used in the invention, may have any structure but is preferably represented by Ar-SM or Ar—S—S—Ar in which M represents a hydrogen atom or alkali metal atom, and Ar represents an aromatic or condensed aromatic ring having one or more nitrogen, sulfur, oxygen, selenium or tellurium atoms. Preferred examples of heterocyclic ring include benzimidazole, naphthimidazole, benzothiazole, naphthothiazole, benzoxazole, naphthoxazole, benzoselenazole, benzotellurazole, imidazole, oxazole, pyrazole, triazole, thiadiazole, tetrazole, triazine, pyrimidine, pyridazine, pyrazine, pyridine, purine, quinoline, and quinazoline. The heterocyclic ring may have a substituent selected, for example, from halogen (e.g., Br, Cl), hydroxy, amino, carboxy, alkyl (e.g., alkyl having one or more, preferably one to four carbon atoms) and alkoxy (e.g., alkoxy having one or more, preferably one to four carbon atoms). Examples of mercapto-substituted heterocyclic aromatic compound include 2-mercaptobenzimidazole, 2-mercaptobenzoxazole, 2-mercaptobenzothiazole, 2-mercapto-5-methylbenzimidazole, 6-ethoxy-2-mercaptobenzothiazole, 2,2'-dithiobis-(benzothiazole), 3-mercapto-1,2,4-triazole, 4,5-diphenyl-2-imidazolethiol, 2-mercaptoimidazole, 1-ethyl-2-mercaptobenzimidazole, 2-mercaptoquinoline, 8-mercaptopurine, 2-mercapto-4(3H)-quinazoline, 7-trifluoromethyl-4-quinolinethiol, 2,3,5,6-tetrachloro-4-pyridinethiol, 4-amino-6-hydroxy-2-mercaptopyrimidine monohydrate, 2-amino-5-mercapto-1,3,4-thidiazole, 3-amino-5-mercapto-1,2,4-triazole, 4-hydroxy-2-mercaptopyrimidine, 2-mercaptopyrimidine, 4,6-diamino-2-mercaptopyrimidine, 2-mercapto-4-methylpyrimidine hydrochloride, 3-mercapto-5-phenyl-1,2,4-triazole, and 2-mercapto-4-phenyloxazole. However, the invention is not limited to these compounds. The amount of the mercapto compound to be added is preferably from 0.001 to 1.0 mol, more preferably from 0.01 to 0.3 mols per mol of silver in the photosensitive layer.

For the details of plasticizer and lubricant which can be incorporated in the photosensitive layer of the invention, reference can be made to JP-A-11-65021 (paragraph [0117]). For the details of ultrahigh contrast agent for forming ultrahigh contrast images, method for adding ultrahigh contrast agent and added amount of ultrahigh contrast agent, reference can be made to compounds of formulae (H), (1) to (3) and (A) and (B) disclosed in JP-A-11-65021 (paragraph [0118]), JP-A-11-223898 (paragraphs [0136]–[0193]), and JP-A-2000-284399 (corresponding to Japanese Patent Application No. 11-87297) and compounds of formulae (III) to (V) (specific examples: [ka-21] to [ka-24]) disclosed in JP-A-2000-347345. For the details of contrast accelerator, reference can be made to JP-A-11-65021 (paragraph [0102]) and JP-A-11-223898 (paragraphs [0194] to [0195]).

The photographic silver halide particle-containing layer of the invention preferably has an absorbance of from 0.1 to 0.6, more preferably from 0.2 to 0.5 at the wavelength of exposing light. When the absorbance of the photosensitive silver halide particle-containing layer is too high, Dmin rises, making it difficult for image to observe. When the absorbance of the photosensitive silver halide particle-containing layer is too low, the sharpness of the image is impaired. In order to provide the photosensitive silver halide layer of the invention with absorbance, any method may be employed, but dyes are preferably used. As such dyes there may be used any compounds which can satisfy the aforementioned absorbance conditions. Examples of these dyes include pyrazoloazole dyes, anthraquinone dyes, azo dyes, azomethine dyes, oxonol dyes, carbocyanine dyes, styryl dyes, triphenylmethane dyes, indoaniline dyes, indophenol dyes, and squalelium dyes. Preferred examples of the dye employable herein include anthraquinone dyes (e.g., Compounds 1 to 9 disclosed in JP-A-5-341441, Compounds 3–6 to 3–18 and 3–23 to 3–38 disclosed in JP-A-5-165147), azomethine dyes (e.g., Compounds 17 to 47 disclosed in JP-A-5-341441), indoaniline dyes (e.g., Compounds 11 to 19 disclosed in JP-A-5-289227, Compound 47 disclosed in JP-A-5-341441, Compounds 2–10 and 2–11 disclosed in JP-A-5-165147), azo dyes (e.g., Compounds 10 to 16 disclosed in JP-A-5-341441), and squalelium dyes (e.g., Compounds 1 to 20 disclosed in JP-A-10-104779, Compounds 1a to 3d disclosed in U.S. Pat. No. 5,380,635). The dye may be added in the form of solution, emulsion or solid fine particle dispersion or in a state mordanted by a polymer mordant. The amount of the compound to be used is determined by the desired absorption but is preferably from 1 μg to 1 g per $m^2$.

In the invention, it is preferred that any part other than the photosensitive silver halide particle-containing layer exhibits an absorbance of from 0.1 to 3.0, more preferably from 0.3 to 2.0 at the wavelength of exposing light from the standpoint of antihalation properties. The portion having the aforementioned absorbance at the wavelength of exposing light is preferably the layer disposed on the support on the side thereof opposite the photosensitive silver halide particle-containing layer (back layer, back side undercoating or subbing layer, protective layer for back layer) or between the photosensitive silver halide particle-containing layer and the support (undercoating or subbing layer).

When the particulate photosensitive silver halide is spectrally sensitized to infrared region, the portion other than the photosensitive silver halide particle-containing layer can be provided with absorbance by any method, but the maximum absorbance in the visible region is preferably not higher than 0.3. As the dye to be used in coloring there may be used the same dye as used to provide the photosensitive silver halide layer with absorbance. The dye to be used in coloring may be the same as or different from that incorporated in the photosensitive silver halide layer.

When the particulate photosensitive silver halide is spectrally sensitized to visible light region, the portion other than the photosensitive silver halide particle-containing layer can be provided with absorbance by any method, but it is preferred that a dye which undergoes extinction upon heat treatment or a combination of a compound which causes a dye to be extinguished and a dye which is extinguished upon heat treatment be used. Examples of the colored layer which undergoes extinction include those disclosed in JP-A-52-139136, JP-A-53-132334, JP-A-56-501480, JP-A-57-16060, JP-A-57-68831, JP-A-57-101835, JP-A-59-182436, JP-A-7-36145, JP-A-7-199409, JP-B-48-33692, JP-B-50-16648, JP-B-2-41734, and U.S. Pat. Nos. 4,088,497, 4,283,487, 4,548,896 and 5,187,049, but the invention should not be limited thereto. The amount of these compounds to be used is determined by the desired absorption but is preferably from 1 μg to 1 g per $m^2$.

The photographic material of the invention may comprise a surface protective layer provided thereon for the purpose of preventing adhesion of the photosensitive layer (image-forming layer) or like purposes. As a binder to be incorporated in the surface protective layer there may be used any polymer. Examples of the binder include polyester, gelatin, polyvinyl alcohol, and cellulose derivative. Preferred among these binders is cellulose derivative. Examples of the cellulose derivative include cellulose acetate, cellulose acetate butyrate, cellulose propionate, hydroxypropyl cellulose, hydroxypropyl methyl cellulose, methyl cellulose, hydroxyethyl cellulose, carboxymethyl cellulose, and mixture thereof, but the invention should not be limited thereto.

The thickness of the surface protective layer of the invention is preferably from 0.1 to 10 μm, particularly from 1 to 5 μm.

The surface protective layer may contain any adhesion inhibitor material. Examples of the adhesion inhibitor material include wax, liquid paraffin, particulate silica, styrene-containing elastomer-based block copolymer (e.g., styrene-butadiene-styrene, styrene-isoprene-styrene), cellulose acetate, cellulose acetate butyrate, cellulose propionate, and mixture thereof.

The photosensitive layer of the invention or the protective layer for the photosensitive layer may comprise a light-absorbing material and a filter dye as disclosed in U.S. Pat. Nos. 3,253,921, 2,274,782, 2,527,583 and 2,956,879 incorporated therein. As described in U.S. Pat. No. 3,282,699, the dye may be mordanted. The amount of the filter dye to be used is preferably from 0.1 to 3, particularly from 0.2 to 1.5 as calculated in terms of absorbance at the wavelength of exposing light.

The photosensitive layer of the invention or the protective layer for the photosensitive layer may comprise a matting agent such as starch, titanium dioxide, zinc oxide, silica and polymer bead (e.g., bead described in U.S. Pat. Nos. 2,992,101 and 2,701,245) incorporated therein. The mattness of the emulsion surface may be arbitrary so far as no stardust defects are produced but is preferably from 200 to 10,000 seconds, particularly from 300 to 10,000 seconds as calculated in terms of Bekk smoothness.

In the heat-developable photosensitive material of the invention, the photosensitive layer comprises one or more layers provided on a support. The one-layer structure must comprise an organic silver salt, a silver halide, a reducing agent and a binder, and optional materials such as toning agent, coating aid and other auxiliaries incorporated therein. The two-layer structure must comprise an organic silver salt and a silver halide incorporated in a first photosensitive layer (normally the layer adjacent to the substrate) and a binder, a reducing agent and some other components incorporated in a second photosensitive layer or both the two layers. A two-layer structure comprising a single photosensitive layer containing all these components and a protective top coat is possible. Referring to the structure of the multi-color photosensitive heat-developable photosensitive material, the combination of the two layers may be contained for each color. Alternatively, as described in U.S. Pat. No. 4,708,928, the single layer may comprise all the components incorporated therein. In the case of multi-dye multi-color photosensitive heat-developable photosensitive material, the various photosensitive layers may be retained separately from each other by providing a functional or non-functional barrier layer interposed between the various photosensitive layers as described in U.S. Pat. No. 4,460,681.

The heat-developable photosensitive material of the invention is preferably a so-called single-sided photographic material comprising at least one photosensitive layer containing a silver halide emulsion, etc. provided on one side of a support and a back layer provided on the other side of the support.

The heat-developable photosensitive material of the invention may comprise a matting agent incorporated therein to improve the conveyability thereof. The matting agent is ordinarily an organic or inorganic particulate compound insoluble in water. As the matting agent there may be used an appropriate material. For example, those well known in the art such as organic matting agent disclosed in U.S. Pat. Nos. 1,939,213, 2,701,245, 2,322,037, 3,262,782, 3,539,344 and 3,767,448 and inorganic matting agent disclosed in U.S. Pat. Nos. 1,260,772, 2,192,241, 3,257,206, 3,370,951, 3,523,022 and 3,769,020 may be used. Specific preferred examples of the organic compound which can be used as a matting agent include water-dispersible vinyl polymers such as polymethyl acrylate, polymethyl methacrylate, polyacrylonitrile, acrylonitrile-α-methylstyrene copolymer, polystyrene, styrene-divinylbenzene copolymer, polyvinyl acetate, polyethylene carbonate and polytetrafluoroethylene, cellulose derivatives such as methyl cellulose, cellulose acetate and cellulose acetate propionate, starch derivatives such as carboxy starch, carboxynitrophenyl starch and urea-formaldehyde-starch reaction product, gelatin cured with known hardener, and gelatin which has been subjected to coacervation curing to form a particulate capsulized hollow material. Specific preferred examples of the inorganic compound which can be used as a matting agent include silicon dioxide, titanium dioxide, magnesium dioxide, aluminum oxide, barium sulfate, calcium carbonate, silver chloride desensitized by a known method, silver bromide desensitized by a known method, glass, and diatomaceous earth. The aforementioned matting agent may comprise different materials in admixture as necessary. The size and shape of the matting agent are not specifically limited. A matting agent having an appropriate particle diameter maybe used. In the invention, it is preferred that a matting agent having a particle diameter of from 0.1 to 30 μm be used. The distribution of particle diameter of the matting agent may be narrow or wide. On the other hand, since the matting agent has a great effect on the haze and surface gloss of the photographic material, the particle diameter, shape and particle diameter distribution of the matting agent are preferably determined to be desired values during the preparation thereof or by mixing a plurality of matting agents.

In the invention, the matting agent is incorporated in the surface of the photosensitive layer and the outermost layer on the back side (optionally photosensitive layer or back layer) or protective layer and subbing layer, preferably the outermost surface layer or layer which acts as outermost surface layer or the layer provided close to the outermost surface or the layer which acts a so-called protective layer.

In the invention, the mattness of the back surface is preferably from 10 seconds to 250 seconds, more preferably from 50 seconds 180 seconds as calculated in terms of Bekk smoothness.

In the invention, the binder suitable for the back layer is transparent or translucent and is normally colorless. Examples of such a binder include natural polymer, synthetic resin, polymer, copolymer, and medium forming a film such as gelatin, gum arabic, poly(vinyl alcohol), hydroxyethyl cellulose, cellulose acetate, cellulose acetate butyrate, poly(vinylpyrrolidone), casein, starch, poly(acrylic acid), poly(methyl methacrylate), poly(vinyl chloride), poly (methacrylic acid), copoly(styrene-maleic anhydride), copoly(styrene-acrylonitrile), copoly(styrene-butadiene), poly(vinyl acetal) (e.g., poly(vinyl formal), poly(vinyl butyral), poly(ester), poly(urethane), phenoxy resin, poly (vinylidene chloride), poly(epoxide), poly(carbonate), poly (vinyl acetate), cellulose ester and poly(amide). The binder may be formed by coating from water, an organic solvent or an emulsion.

A backside resistive heating layer as disclosed in U.S. Pat. Nos. 4,460,681 and 4,374,921 may be incorporated in the photosensitive heat-developable photographic image system.

The photosensitive layer, protective layer and back layer of the invention may each comprise a hardener incorporated therein. For the details of the hardener employable herein, reference can be made to polyisocyanates disclosed in U.S. Pat. No. 4,281,060 and JP-A-6-208193, epoxy compounds disclosed in U.S. Pat. No. 4,791,042, and vinylsulfone-based compounds disclosed in JP-A-62-89048.

In the invention, a surface active agent may be used for the purpose of improving antistatic properties thereof. Examples of the surface active agent which can be appropriately used herein include nonionic surface active agents, anionic surface active agents, cationic surface active agents, and fluorine-based surface active agents. Specific examples of these surface active agents include fluorine-based polymer surface active agents disclosed in JP-A-62-170950 and U.S. Pat. No. 5,380,644, fluorine-based surface active agents disclosed in JP-A-60-244945 and JP-A-63-188135, polysiloxane-based surface active agents disclosed in U.S. Pat. No. 3,885,965, and polyalkylene oxide and anionic surface active agents disclosed in JP-A-6-301140.

Examples of the solvent to be used herein include those disclosed in "Shinban Yozai Poketto Bukku (New Edition of Solvent Pocket Book)", Ohmsha, Ltd., 1994, but the invention should not be limited thereto. The boiling point of the solvent to be used herein is preferably from 40 to 180° C.

Examples of the solvent employable herein include hexane, cyclohexane, toluene, methanol, ethanol, isopropanol, acetone, methyl ethyl ketone, ethyl acetate, 1,1,1-trichloroethane, tetrahydrofurane, triethylamine, thiophene, trifluoroethanol, perfluoropentane, xylene, n-butanol, phenol, methyl isobutyl ketone, cyclohexanone, butyl acetate, diethyl carbonate, chlorobenzene, dibutyl ether, anisole, ethylene glycol diethyl ether, N,N-dimethylformamide, morpholine, propane sultone, perfluorotributylamine, and water.

The photosensitive layer of the invention may be coated on various supports. Representative examples of the supports include polyester film, undercoated polyester film, poly(ethylene terephthalate) film, polyethylene naphthalate film, cellulose nitrate film, cellulose ester film, poly (vinyl acetal) film, polycarbonate film, glass, paper, and metal. Typically, a flexible substrate, particularly a partially acetylated paper support or a paper support coated with a baryta and/or α-olefin polymer, particularly polymer of $C_2$–$C_{10}$α-olefin such as polyethylene, polypropylene and ethylene-butene copolymer, may be used. The support may be transparent or opaque, preferably transparent.

The heat-developable photosensitive material of the invention may comprise an antistatic layer or electrically-conductive layer such as layer containing a soluble salt (e.g., chloride, nitrate), vacuum metal deposit layer, layer containing an ionic polymer as disclosed in U.S. Pat. Nos. 2,861,056 and 3,206,312 and layer containing an insoluble inorganic salt as disclosed in U.S. Pat. No. 3,428,451.

As a method for obtaining a color image using the heat-developable photosensitive material of the invention there may be used method described in JP-A-7-13295, line 43, left column, page 10—line 40, left column, page 11. As a stabilizer for color dye image there may be used compounds exemplified in British Patent 1,326,889, U.S. Pat. Nos. 3,432,300, 3,698,909, 3,574,627, 3,573,050, 3,764,337 and 4,042,394.

The heat-developable photographic emulsion of the invention can be coated in various manners such as dip coating, air knife coating, flow coating and extrusion coating using a hopper of the type disclosed in U.S. Pat. No. 2,681,294. If necessary, two or more layers may be coated simultaneously in a manner disclosed in U.S. Pat. No. 2,761,791 and British Patent 837,095.

The heat-developable photosensitive material of the invention may comprise additional layers incorporated therein such as dye-receptive layer for receiving a mobile dye image, opaque layer to be provided in the case where reflective printing is desired, protective top coat layer and primer layer known in photothermal photography. It is preferred that a single sheet of the photographic material of the invention can form an image. It is thus preferred that the functional layer required for the formation of image such as image-receiving layer does not constitutes a material other than the aforementioned photographic material.

The photographic material of the invention may be subjected to development in any manner. In practice, however, the photographic material which has been imagewise exposed to light is heated for development. The development temperature is preferably from 80 to 250° C., more preferably from 100 to 140° C. The development time is preferably from 1 to 180 seconds, more preferably from 10 to 90 seconds. The development of the photographic material of the invention is preferably accomplished by a method involving the use of heated drum.

The photographic material of the invention may be subjected to exposure in any manner. In practice, however, laser beam is preferably used as a exposing light source. Preferred examples of the laser beam employable herein include gas laser beam, dye laser beam, and semiconductor laser beam. The semiconductor laser or YAG laser may be used in combination with a second harmonic generating element.

The heat-developable photosensitive material of the invention is then slit into a desired size such as half size, B4 size and A4 size. A plurality of sheets of the heat-developable photosensitive material are laminated, and then wrapped in the wrapping material of the invention.

The wrapping material of the invention comes in direct contact with at least a part of the photographic material. The wrapping material is a paper. The term "paper" as used herein means a material comprising a paper incorporated therein in at least a part thereof. The wrapping material of the invention preferably comprises a paperboard (base board) incorporated therein as a substrate. The wrapping material of the invention preferably exhibits a basis weight of from 250 to 400 $g/m^2$, particularly from 270 to 350 $g/m^2$. As the pulp from which the paperboard is made, there is preferably used a virgin pulp, more preferably BKP. Examples of such a virgin pulp include pine pulp, birch pulp, and mixture of pine pulp and birch pulp. In particular, wood pulp dissolved under neutral condition and bleached in ECF process is preferably used. The aforementioned paperboard is preferably processed with an ordinary sizing agent to prevent the generation of paper powder or fluffing. As the sizing agent there is preferably used an alkaline ketene dimer (AKD).

More preferably, a paper comprising a laminate layer made of other materials provided on at least one surface thereof (preferably both surfaces) is used. A paper having the aforementioned laminate layer which comprises a metal preferably in a proportion of from not lower than 5%, more preferably not lower than 10%, still more preferably from 50 to 100% of the thickness may be used. Such a wrapping material is preferably used as a contact surface with the heat-developable photosensitive material to be wrapped on the image-recording layer side thereof (i.e., image-recording layer side surface). In the case where the wrapping material of the invention has a laminate layer on one side thereof, it is wrapped in such an arrangement that the laminate layer of wrapping material comes in contact with the image-recording layer. Thus, the wrapping material of the invention may be applied to the portion where it comes in contact with at least the image-recording layer. In practice, however, the wrapping material of the invention is preferably applied to the entire material for wrapping. In the invention, the wrapping material or part thereof which comes in contact with the heat-developable photosensitive material is occasionally referred to as "protective carrier".

The use of the aforementioned protective carrier material makes it possible to inhibit the change of properties of the heat-developable photosensitive material with the lapse of time when wrapped with the wrapping material and shipped and hence obtain stabilized properties. Further, the use of the aforementioned protective carrier material makes it possible to keep the heat-developable photosensitive material in an orderly form and hence inhibit the occurrence of conveyance troubles in the processing apparatus and obtain a good operating efficiency.

In the invention, as the aforementioned laminate layer material there is preferably used one having a thickness of from 5 to 100% of the wrapping material and excellent barrier properties, shape memory effect and scratch resistance.

As the laminate layer material there may be used any suitable material selected from materials described in "Kinousei Housou Zairyou no Shintenkai (New Development of Functional Wrapping Materials)", Toray Research Center, pages 33 and 118–122. Preferred examples of the materials include polypropylenes (e.g., "Torayfan YM-11", biaxially-stretched polypropylene produced by Toray Co., Ltd., "OPA", biaxially-stretched polypropylene produced by Futamura Chemical Industries, Ltd.), and polyethylenes (preferably high density polyethylene).

The total thickness of the laminate layer is preferably from 5 to 100 μm, more preferably from 5 to 50 μm.

The thickness of the paper itself before the application of the laminate layer is preferably from 250 to 450 μm, more preferably from 300 to 400 μm.

The ultraviolet-curing resin for use in the invention means a resin which cures when irradiated with active energy rays such as ultraviolet rays or electron rays. Such an ultraviolet-curing resin comprises as a main component an addition-polymerizable unsaturated compound having two or more acryloyl groups or methacryloyl groups per molecule incorporated therein. In general, such an ultraviolet-curing resin is used in combination with a small amount of a photopolymerization initiator. As such a polymerization initiator there is preferably used a radical polymerization initiator and/or cationic polymerization initiator.

In order to form a protective layer on the wrapping material of the invention, an ultraviolet-curing resin is optionally mixed with a non-reactive resin, a surface active agent or the like to prepare an ultraviolet-curing ink. The ultraviolet-curing ink thus prepared is then printed on the wrapping material of the invention by an appropriate printing method. Subsequently, the ultraviolet-curing ink is irradiated with an active energy ray such as ultraviolet ray so that it is cured to form a protective layer.

The ultraviolet-curing ink to be used herein can be prepared by appropriately mixing a polyfunctional monomer, a photopolymerization initiator and a non-reactive solid resin described in JP-A-54-8007, JP-A-56-93776, JP-A-56-116763, JP-A-3-252472 and JP-A-8-173898. The aforementioned ultraviolet-curing ink may further comprise a prepolymer, an inorganic pigment, a polymerization inhibitor, and a wax incorporated therein, if desired, besides the aforementioned polyfunctional monomer.

In the wrapping material of the invention, an OP (over print) varnish is preferably printed on the paperboard which is a substrate, and then cured to form a protective layer thereon. In the invention, an OP varnish which cures when irradiated with an active energy ray such as ultraviolet ray (UV) or electron ray is preferably used. The term "UV-curing OP varnish" as used herein means a varnish which rapidly reacts and cures when irradiated with ultraviolet rays. The UV-curing OP varnish preferably comprises a polyfunctional ethylenically unsaturated bond as a monomer which cures when irradiated with ultraviolet rays. Examples of the polyfunctional ethylenically unsaturated compound include an ester of a polyvalent alcohol with acrylic acid or methacrylic acid. Examples of the polyvalent alcohol include divalent alcohols such as ethylene glycol, 1,2-propylene glycol and 1,3-butylene glycol, trivalent alcohols such as glycerin, trimethylol ethane and trimethylol propane, tetravalent alcohols such as pentaerythritol, pentavalent alcohols such as pentit, and hexavalent alcohols such as dipentaerythritol and sorbit. Preferred examples of the monomer employable herein include trimethylolpropane triacrylate. The molecular weight of the monomer is preferably from 400 to 500. The lower the molecular weight of the monomer is, the better is the foldability of the resulting wrapping material for the photographic material of the invention.

Examples of commercially available OP varnishes include Daicure Inline Offset OP Varnish and Daicure RX OP Varnish T-6 (produced by DAINIPPON INK AND CHEMICALS, INCORPORATED).

The UV-curing OP varnish usually comprises additives having various functions such as inorganic pigment, photopolymerization initiator, polymerization inhibitor, surface active agent and wax incorporated therein besides the aforementioned monomer depending on the purpose.

The UV-curing varnish doesn't need to supply powder such as corn starch for inhibiting ink-transfer and thus is suitable particularly for wrapping of heat-developable photosensitive material, which should be prevented from the occurrence of WS (white spot). Further, since a typical OP varnish is transparent, the deinking step can be omitted from the process for the regeneration of used paper. When the OP varnish is lightly colored, the varnish-free zone can be easily viewed during punching. Further, the black ink and the OP varnish can be separately printed at one pass, allowing application to printing of register for positioning for punching, code for recognition of kind of products or lot, etc.

As a method for forming the protective layer there may be used e.g., an offset printing method involving the use of ordinary PS plate, rubber plate and resin plate on paperboard which is a substrate. The coated amount of OP varnish is preferably from 1 to 5 $g/m^2$, particularly from 1.5 to 2.5 $g/m^2$. The friction coefficient $\mu$ of the OP varnish-coated layer obtained by coating and curing the OP varnish is preferably not higher than 0.25, particularly not higher than 0.19 with respect to polished SUS plate.

In order to cure the OP varnish of the invention, all UV lamps in an ordinary UV printing machine may be turned on.

The protective layer made of OP varnish may be formed on the paperboard only on the side thereof in contact with the photosensitive material (inner side) but is preferably formed on both sides of the paperboard.

The term "OP varnish-free" as used herein means that no protective layer of OP varnish is provided on at least one side of the wrapping material for wrapping the photosensitive material along the folding line for over a width of from 0.5 to 2.0 mm across the folding line.

Whether the OP varnish-free zone may be provided only on one side of the wrapping material or must be provided on both sides of the wrapping material depends on the process for forming the folding line zone. In the case where the folding zone is formed by providing half cut along the folding line on the outer side of the wrapping material, it suffices if a varnish-free zone is formed only inside the folding line. On the contrary, in the case where the folding zone is formed by ribbing the folding line, an OP varnish-free zone is preferably provided on both inner and outer sides of the wrapping material in the vicinity of the folding line to provide the wrapping material with a good foldability. Further, since the OP varnish-free zone is provided over a width of not greater than 1 mm from the end of film, there is no apprehension that the barrier properties of the entire protective layer can be impaired.

The OP varnish-free zone may be formed all along the folding line on the wrapping material. In particular, however, it may be formed only on the site having a poor foldability.

The OP varnish-free zone can be applied to printing of code for recognition of kind of products and lot, printing of expiration date, etc. In some detail, the site on the wrapping material where the aforementioned data are to be printed by a known means such as ink jet printer and hot stamp or where letters are to be written with an aqueous pen or pencil may be previously rendered OP varnish-free. In this case, the varnish-free zone may be provided on the outer surface of the protective carrier over the top surface 4, bottom surface 2, connecting portion 3, flaps 6*a*, 6*b*, etc.

Referring further to the method for forming the wrapping material of the invention, the wrapping material is preferably formed by simply punching a raw paper with a Thomson blade die or rotary-punching a raw paper. The removal of paper powder is preferably accomplished by destaticization, blowing with clean air or brushing or by means of a vacuum cleaner. The registration of the printed pattern with the punched-pattern can be accomplished by any known method. It is particularly preferred to prevent the further occurrence of paper powder by punching the wrapping material by a metal die, and then applying a lacquer or the like to the punched section.

In order to render a sheet-like photosensitive material comprising a plurality of sheets easily wrappable in the wrapping material of the invention or fittable in the apparatus, a folding line zone is preferably formed on the wrapping. This is accomplished by effecting external half cutting, ruling such as cold ribbing and hot ribbing and rouletting in proper combination. In the invention, external half cutting is preferred. This working may be effected simultaneously with or separately from the simple punching.

A preferred embodiment of the wrapped material comprising the wrapping material for heat-developable photosensitive material of the invention will be described below with reference to the attached drawings.

Figure 1B:
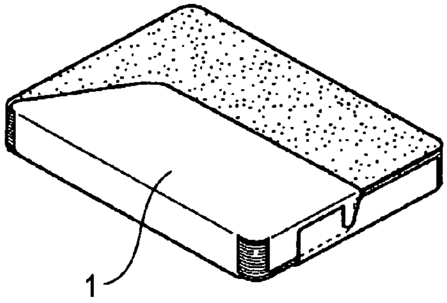
FIG. 1B is a schematic view illustrating one embodiment of the invention wherein a wrapping material for heat-developable photosensitive material is used as a protective carrier.
Figure 1C:
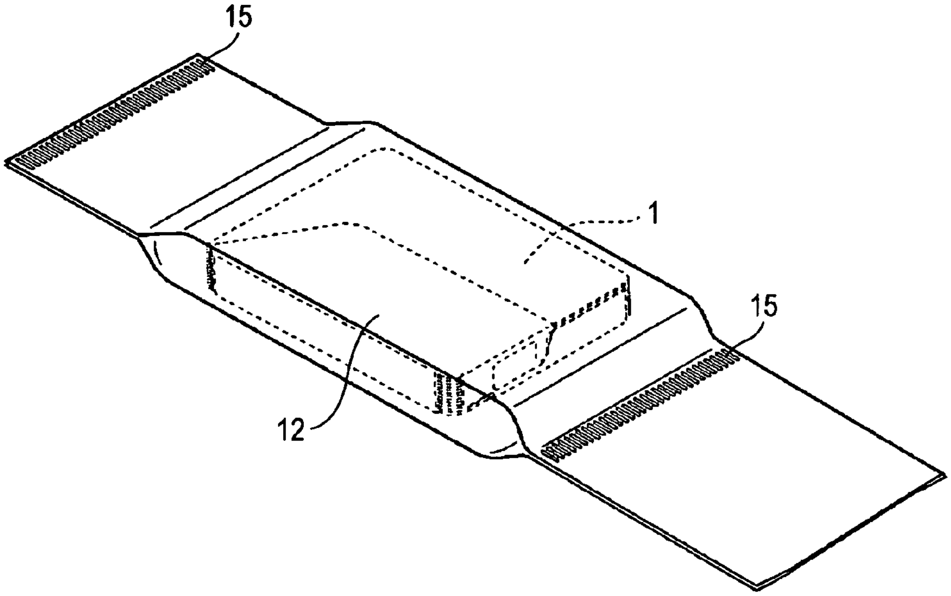
FIG. 1C is a schematic view illustrating another embodiment of the invention wherein a laminated heat-developable photosensitive material wrapped with a protective carrier is wrapped in a moistureproof inner wrapping bag.
Figure 2:
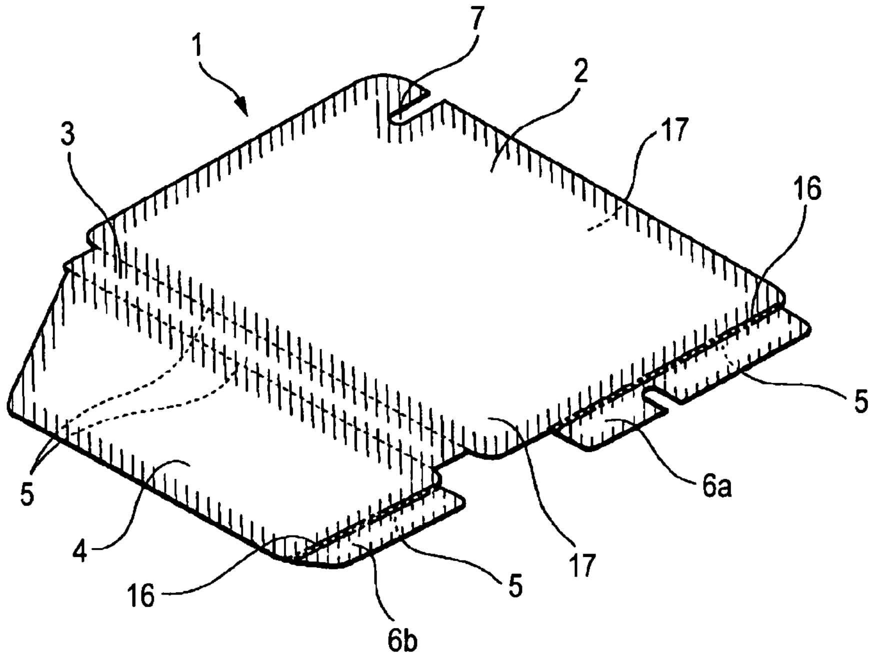
FIG. 2 is a schematic view illustrating one embodiment of a protective carrier formed from a wrapping material.

As shown in FIG. 1A, the heat-developable photosensitive material 10 is slit into a plurality of sheets having a desired size which are then laminated in a predetermined number to form a film laminate 11. As shown in FIG. 1B, the film laminate 11 is wrapped in a protective carrier 1 according to the invention. The protective carrier 1 is coated with an UV-curing OP varnish 17 as shown in FIG. 2 on both surfaces thereof. Further, as shown in FIG. 1C. the film laminate 11 wrapped in the protective carrier 1 is sealed in a light shielding moistureproof inner wrapping bag 12. The protective carrier 1 integrally comprises a bottom surface 2, a connecting portion 3 and a top surface 4 as shown in FIG. 2. The protective carrier 1 is arranged so as to be freely folded at a half cut 5. The protective carrier 1 protects the film laminate 11 on the bottom surface, top surface and two surrounding side thereof. The protective carrier 1 is also shaped so as to allow the heat-developable photosensitive material sheets 10 to be taken out one by one from the top surface. The bottom surface 2 of the protective carrier 1 has almost the same size as the film laminate 11 to protect the entire surface of the film laminate 11. The bottom surface 4 of the protective carrier 1 has a notch to prevent its interference with the suction pad for film supply in the heat developing machine.

Figure 3:
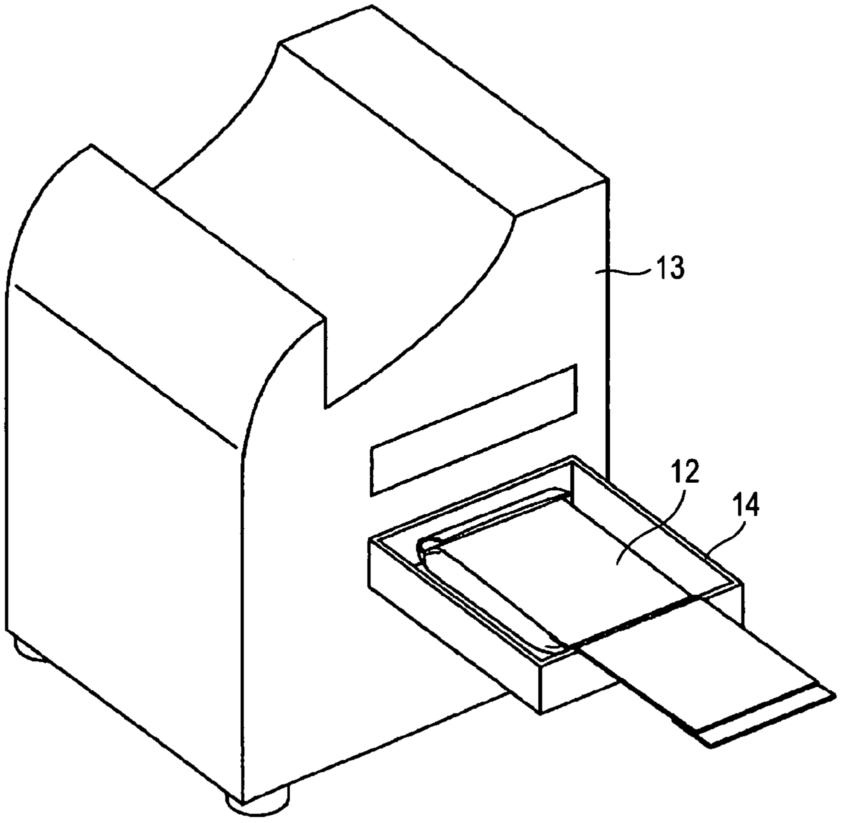
FIG. 3 is a schematic view illustrating a state of mounting an inner wrapping bag including a laminated heat-developable photosensitive material wrapped with a protective carrier as a wrapping material on the cassette of a heat developing machine.

In order to use the heat-developable photosensitive material 10, the inner wrapping bag 12 is cut at one end thereof while being entirely mounted on the cassette 14 of the heat developing machine 13 in alight room as shown in FIG. 3. Subsequently, the cassette 14 is received in the heat developing machine 13 so that it is protected against light. The inner wrapping bag is then pulled out of the machine to complete loading. It is preferred that flaps 6*a* and 6*b* be provided on the bottom surface 2 and the top surface 4 of the protective carrier 1, respectively, as shown in FIG. 2, to keep the film laminate 11 integrated and prevent the sheets from going out of order when the inner wrapping bag 12 is pulled out of the machine. The bottom side flap 6*a* is preferably provided with a notch so that the both flaps can be engaged each other. Since the folding zone across the bottom surface 2 and the flap 6*a* and across the top surface 4 and the flap 6*b* have poor foldability in particular, an OP varnish-free zone 16 is preferably provided along these folding lines.

Further, the bottom surface 2 of the protective carrier 1 is preferably provided with means for leaking vacuum suction such as hole, notch and unevenness at the position on which the suction pad of the heat developing machine 13 acts so that the heat developing machine 13 can detect the presence or absence of the heat-developable photosensitive material 10. In particular, a notch having a long U shape is preferred.

In order to wrap the product in the moistureproof inner wrapping bag 12, the humidity in the bag is preferably conditioned before sealing.

The invention will be further described with reference to the following examples, but the invention should not be construed as being limited thereto.

EXAMPLE 1

<Preparation of Photosensitive Silver Halide Emulsion>

To 5,429 ml of water were added 88.3 g of phenylcarbamoyl gelatin, 10 ml of a 10% aqueous methanol solution of a PAO compound ($HO(CH_2CH_2O)_n$—$(CH(CH_3)CH_2O)_{17}$—$(CH_2CH_2O)_m$—H in which the sum of m and n is from 5 to 7) and 0.32 g of potassium bromide to make a solution. To the solution which had been kept at 45° C. were then added 659 ml of a 0.67 mol/l aqueous solution of silver nitrate and a solution having KBr and KI dissolved therein in an amount of 0.703 mol and 0.013 mol per 1, respectively, in a double jet process while pAg was being controlled to 8.09 using a mixing agitator disclosed in JP-B-58-58288 and JP-A-58-58289 for 4 minutes and 45 seconds to effect nucleation. After 1 minute, to the emulsion was then added 20 ml of a 0.63 N aqueous solution of potassium hydroxide. After 6 minutes, to the emulsion were then added 1,976 ml of a 0.67 mol/l aqueous solution of silver nitrate and a solution having KBr, potassium iodide and dipotassium hexachloroiridate dissolved therein in an amount 0.657 mol, 0.013 mol and 30 μmol per 1, respectively, in a double jet process while the temperature and pAg were being controlled to 45° C. and 8.09, respectively, for 14 minutes and 15 seconds. After 5 minutes of stirring, the temperature of emulsion was lowered to 40° C.

To the emulsion was then added 18 ml of a 56% aqueous solution of acetic acid to allow the sedimentation of silver halide emulsion. The resulting supernatant liquid was then removed leaving behind 2 l of the sediment portion. To the emulsion was then added 10 l of water. The emulsion was stirred, and then subjected to sedimentation of silver halide emulsion. The resulting supernatant liquid was the removed leaving behind 1.5 l of the sediment portion. To the emulsion was then added 10 l of water. The emulsion was stirred, and then subjected to sedimentation of silver halide emulsion. The resulting supernatant liquid was then removed leaving behind 1.5 l of the sediment portion. To the sediment portion was then added a solution obtained by dissolving 1.72 g of anhydrous sodium carbonate in 151 ml of water. The emulsion was then heated to a temperature of 60° C. The emulsion was then stirred for 120 minutes. Finally, the emulsion was adjusted to pH 5.0. To the emulsion was then added water to make 1,161 g per mol of silver.

The emulsion thus obtained was a monodisperse emulsion of cubic silver iodobromide particles having an average particle size of 0.058 μm, a particle size variation coefficient of 12% and a {100} plane proportion of 92%.

<Preparation of Powdered Organic Silver Salts A to F>

To 4,720 ml of pure water were added behenic acid, arachidic acid and stearic acid at a ratio set forth in Table 1 totaling 0.7552 mols. Dissolution was effected at a temperature of 80° C. To the solution was then added 540.2 ml of a 1.5 N aqueous solution of sodium hydroxide. To the mixture was then added 6.9 ml of concentrated nitric acid. The solution was then cooled to a temperature of 55° C. to obtain an organic acid sodium salt solution. To the organic acid sodium salt solution were then added 45.3 g of the aforementioned silver halide emulsion and 450 ml of pure water while the temperature thereof was being kept to 55° C. The mixture was then stirred at 13,200 rpm (machine vibration frequency: 21.1 KHz) using an ULTRA-TURRAXT-25 homogenizer (produced by IKA JAPAN Co., Ltd.) for 5 minutes. Subsequently, to the emulsion was added 702.6 ml of a 1 mol/l solution of silver nitrate for 2 minutes. The mixture was then stirred for 10 minutes to obtain an organic silver salt dispersion. Thereafter, the organic silver salt dispersion thus obtained was transferred into a rinsing vessel. To the organic silver salt dispersion was then added deionized water. The mixture was stirred, and then allowed to stand to cause the organic silver salt dispersion to be floated and separated. The lower water-soluble salts were then removed. Thereafter, the organic silver salt dispersion was repeatedly washed with deionized water until the electrical conductivity of the wash water reached 2 μS/cm, and then subjected to centrifugal dehydration. The organic silver salt dispersion was then dried at a temperature of 40° C. with a hot air having an oxygen partial pressure of 10% in a circulating dryer until mass reduction no longer occurred to obtain powdered organic silver salt.

TABLE 1

| Organic silver salt | Behenic acid (mol-%) | Arachidic acid (mol-%) | Stearic acid (mol-%) |
|---|---|---|---|
| A | 35 | 39 | 26 |
| B | 45 | 33 | 22 |
| C | 55 | 27 | 18 |
| D | 65 | 21 | 14 |
| E | 75 | 15 | 10 |
| F | 85 | 9 | 6 |

<Preparation of Photosensitive Emulsion Dispersion>

14.57 g of a polyvinyl butyral powder (Butvar B-79, produced by Monsant Inc.) were dissolved in 1,457 g of methyl ethyl ketone (MEK). To the solution was then added gradually 500 g of powdered organic silver salt with stirring using a DISPERMAT CA-40M dissolver (produced by VMA-GETZMANN Inc.) to make thorough mixing, thereby forming a slurried material. The aforementioned slurry was then subjected to dispersion by two passes using a GH-2 pressure homogenizer (produced by SMT Co., Ltd.) to prepare a photosensitive emulsion dispersion. During the procedure, the processing pressure at the first pass was $2,746\times10^4$ Pa (280 kg/cm$^2$), and the processing pressure at the second pass was $5,492\times10^4$ Pa (560 kg/cm$^2$). Tg of the binder was 68° C.

<Preparation of Photosensitive Layer Coating Solution A to F>

To the aforementioned photosensitive emulsion dispersion (50 g) was added 15.1 g of MEK. The mixture was then kept at a temperature of 21° C. while being stirred at 1,000 rpm using a disolver type homogenizer. To the mixture was then added 390 μl of a 10 weight % methanol solution of an association product of two molecules of N,N-dimethylacetamide, one molecule of bromic acid and one molecule of bromine. The mixture was then stirred for 1 hour. Subsequently, to the mixture was added 167 mg of a methanol solution containing 15.9% by weight of dibenzo-18-crown-6 and 4.9% by weight of potassium acetate. The mixture was then stirred for 10 minutes. To the mixture was then added 2.6 g of an MEK solution of 0.24% by weight of sensitizer A, 18.3% by weight of 2-chlorobenzoic acid, 34.2% by weight of salicylic acid-p-toluene sulfonate and 4.5% by weight of 5-methyl-2-mercaptobenzimidazole. The mixture was then stirred for 1 hour. Thereafter, the mixture was cooled to a temperature of 13° C. where it was then further stirred for 30 minutes. To the mixture was then added 13.31 g of a polyvinyl butryal (Butvar B-79, produced by Monsant Inc.) while being kept at a temperature of 13° C. The mixture was then stirred for 30 minutes. To the mixture was then added 1.08 g of a 9.4 weight % tetrachlorophthalic acid solution. The mixture was then stirred for 15 minutes. To the mixture were then added a 20 weight % reducing agent set forth in Table 2 in an amount set forth in Table 2 and 12.4 g of a 1.1 weight % MEK solution of 4-methylphthalic acid and dye A with stirring. Subsequently, to the mixture was added 1.5 g of a 10 weight % Desmodur N3300 (aliphatic isocyanate produced by Mobay Co.). To the mixture was then added 4.27 g of an MEK solution of 7.4% by weight of tribromomethyl-2-azaphenylsulfone and 7.2% by weight of phthalazine to obtain a photosensitive layer coating solution.

<Preparation of Surface Protective Layer Coating Solution>

To 865 g of MEK were added 96 g of cellulose acetate butyrate (CAB171-15, produced by Eastman Chemical Inc.), 4.5 g of polymethyl methacrylate (Paraloid A-21, produced by Rohm & Haas Company), 1.5 g of 1,3-di (vinylsulfonyl)-2-propanol, 1.0 g of benzotriazole and 1.0 g of a fluorine-based surface active agent (Surflon KH40, produced by ASAHI GLASS COMPANY) with stirring to make a solution. To the solution was then added 30 g of a dispersion obtained by dispersing 13.6% by weight of cellulose acetate butyrate (CAB171-15, produced by Eastman Chemical Inc.) and 9% by weight of calcium carbonate (Super-pflex200, produced by Speciality Minerals, Inc.) in MEK at 8,000 rpm using a dissolver type homogenizer for 30 minutes. The mixture was then stirred to prepare a surface protective layer coating solution.

<Preparation of Support>

A PET film having a thickness of 175 μm which had been colored blue to a density of 0.170 (measured by a TD-904 densitometer, produced by Macbeth Inc.) was subjected to corona discharge treatment at 8 $W/m^2 \cdot min$ on both side thereof.

<Coating on Back Side>

To 830 g of MEK were added 84.2 g of cellulose acetate butyrate (CAB 381-20, produced by Eastman Chemical Inc.) and 4.5 g of a polyester resin (Vitel PE2200B, produced by Bostic Inc.) with stirring to make a solution. To the solution was then added 0.30 g of dye B. To the solution was then added a solution of 4.5 g of a fluorine-based surface active agent (Surflon KH4Q, produced by ASAHI GLASS COMPANY) and 2.3 g of a fluorine-based surface active agent (Megafac F120K, produced by DAINIPPON INK AND CHEMICALS, INCORPORATED) in 43.2 g of methanol. The mixture was then stirred thoroughly to complete dissolution. Finally, to the solution was added 75 g of a dispersion obtained by 1% by weight of silica (Siloid 64×6000, produced by W. R. Grace Inc.) in methyl ethyl ketone using a dissolver type homogenizer. The mixture was then stirred to prepare a back layer coating solution.

The back layer coating solution thus prepared was applied to the support to a dry thickness of 3.5 μm by an extrusion coater, and then dried using drying air having a drying temperature of 100° C. and a dew point of 10° C. for 5 minutes.

<Preparation of Heat-Developable Photosensitive Material>

The aforementioned photosensitive layer coating solutions A to F were each applied to the back layer-coated support simultaneously with the surface protective layer coating solution using an extrusion coater to prepare heat-developable photosensitive materials A to F, respectively. The photosensitive layer coating solution was applied in an amount of 1.9 $g/m^2$ as calculated in terms of silver. The surface protective layer coating solution was applied to a dry thickness of 2.5 μm. Thereafter, the heat-developable photosensitive materials were each dried using drying air having a drying temperature of 75° C. and a dew point of 10° C. for 10 minutes. The content of solvent in the photographic material was 40 $mg/m^2$.

The photographic material was sampled by 100 $cm^2$. The photosensitive layer was then peeled off in MEK. Using a Microdigest A300 microwave wet decomposer (produced by Prolabo Inc.), the photosensitive layer was then decomposed with sulfuric acid and nitric acid. Using a PQ-ΩICP-MS (Inductively Coupled Plasma Mass Spectrometer) (produced by VG Elemental Co., Ltd.), the sample was then analyzed on a calibration curve. As a result, the photosensitive layer was found to have a Zr content of not higher than 10 μg per mg of Ag.

TABLE 2

| Heat-developable photosensitive material | Photosensitive coating solution | Organic silver salt | Reducing agent | Added amount of reducing agent |
|---|---|---|---|---|
| A | A | A | R-1 | 9.0 g |
| B | B | B | " | 9.2 g |
| C | C | C | " | 9.4 g |
| D | D | D | " | 9.6 g |
| E | E | F | " | 9.8 g |
| F | F | F | " | 10.0 g |

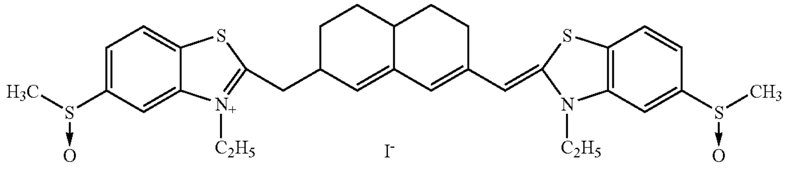

Sensitizer A

TABLE 2-continued

| Heat-developable photosensitive material | Photosensitive coating solution | Organic silver salt | Reducing agent | Added amount of reducing agent |
|---|---|---|---|---|

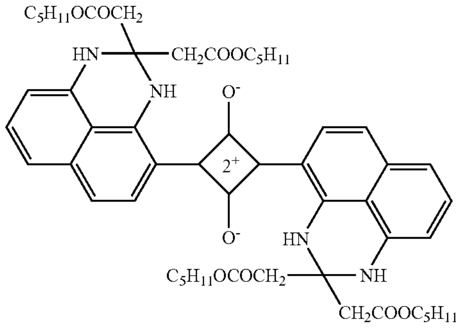

Dye A

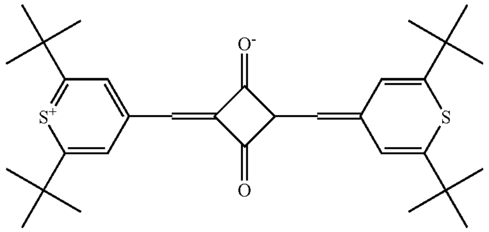

Dye B

The heat-developable photosensitive materials A to F thus prepared were each slit into B4 size. As shown in FIG. 1A, 150 sheets of B4 size heat-developable photosensitive material 10 were stacked. The stack was then wrapped in a protective carrier 1 having the following composition in such an arrangement that the protective carrier 1 comes in direct contact with the heat-developable photosensitive material on the image-recording layer side thereof (the lower surface of the heat-developable photosensitive material 10 corresponds to the image-recording layer side in FIG. 1A) at 25° C. and 60% RH (relative humidity). The protective carrier 1 was then wrapped in a polypropylene-coated inner wrapping bag 12 for protection against light and moisture as shown in FIG. 1C. Testing was made on the combination of absence of protective carrier, protective carriers (1) to (4) and heat-developable photosensitive materials A to F set forth in Table 3.

Protective Carrier (1): Paper pulp paperboard having a thickness of 425 μm obtained by bleaching BKP in ECF process (2): Laminated paper obtained by subjecting paper pulp paperboard having a thickness of 425 μm obtained by bleaching BKP in ECF process to corona treatment, and then melt-laminating PP on both sides of paperboard (in an amount corresponding to 20 μm)

(3): Laminated paper obtained by subjecting paper pulp paperboard having a thickness of 425 μm obtained by bleaching BKP in ECF process to corona treatment, and then melt-laminating HDPE on the outer surface of paperboard (in an amount corresponding to 20 μm) and LDPE on the inner surface of paperboard (in an amount corresponding to 20 μm)

(4): Paperboard obtained by coating paper pulp paperboard having a thickness of 425 μm obtained by bleaching BKP in ECF process with a UV-curing OP varnish (Daicure Inline Offset OP varnish; in an amount corresponding to 2 μm) on the outer surface thereof and a UV-curing OP varnish (Daicure Inline Offset OP varnish; in an amount corresponding to 2 μm) on the inner surface thereof leaving the folding line zone uncoated by PS plate offset printing method, and then irradiating the paperboard with ultraviolet rays to form a protective layer thereon (Exposure and Development)

An exposing machine comprising as a light source a vertical multi-mode high frequency superimposition type semiconductor laser emitting laser beam having a wavelength of from 800 nm to 820 nm was made on trial. Using this exposing machine, the heat-developable photosensitive material prepared above was subjected to scanning exposure to laser beam on the emulsion layer side thereof. During the procedure, an image was recorded on the heat-developable photosensitive material with a scanning laser beam at an incidence angle of 75 degrees with respect to the exposed surface. Thereafter, using an automatic developing machine having a heat drum, the heat-developable photosensitive material was then subjected to heat development at a temperature of 124° C. for 15 seconds in such a manner that the protective layer in the heat-developable photosensitive material came in contact with the surface of the drum. The resulting image was then evaluated by a densitometer. The room used for exposure and development had a temperature of 23° C. and a humidity of 50% RH. As compared with the case where image recording was made with ordinary scanning laser beam at an incidence angle of 90 degrees with respect to the exposed surface of the photographic material, the aforementioned procedure showed little image deterioration attributed to unevenness in interference. Further, an image having a good sharpness and contrast was unexpectedly obtained.

<Evaluation>

(Image Preservability)

The heat-developable photosensitive material which had thus been subjected to exposure and heat development was thoroughly exposed to light, conditioned at 70% RH for 3 hours, and then sealed in a light shielding bag which was then allowed to stand at 60° C. for 72 hours. The resulting Dmix rise is set forth in Table 3. The smaller this value is, the better is image preservability.

(Change of Optical Density)

A stack of 150 sheets of the heat-developable photosensitive materials A to F were each stored free or wrapped in protective carriers (1) to (4) at a temperature of 40° C. for 10 days. The heat-developable photosensitive materials which had been brought into contact with the protective carriers were each subjected to laser exposure and heat development in the same manner as mentioned above. The heat-developable photosensitive materials were each then measured for black density at an exposure giving a black density of 1.0 before storage. Thus, the change of optical density was measured. The change of optical density is preferably as small as possible.

(Handleability in Apparatus)

The heat-developable photosensitive materials wrapped in various wrapping materials (no protective carrier and protective carriers (1) to (4)) were each packed in a tray in a light room. The heat-developable photosensitive material was then unwrapped. The 150 sheets (B4 size) were then evaluated for conveyability. The results are set forth in Table 3.

E (excellent): No problems, acceptable

P (poor): 10% or more of the 150 sheets shown difficult in conveyance, unacceptable <Recyclability of Used Paper>

The wrapping materials which can be recycled free from deinking step are judged excellent (E). The wrapping materials which can be recycled if deinking is effected are judged good (G). The wrapping materials which can be recycled using a facility dedicated to remove fine pieces of PE resin or the like are judged fair (F).

TABLE 3

| Experiment No. | Wrapping material | Heat-developable photosensitive material | Image preservability (ΔDmin) | Change of optical density | Handleability in apparatus | Recyclability of used paper | Remarks |
|---|---|---|---|---|---|---|---|
| 1 | No protective carrier | A | 0.30 | 0.02 | P | — | Comparison |
| 2 | No protective carrier | B | 0.18 | 0.02 | P | — | " |
| 3 | No protective carrier | C | 0.05 | 0.02 | P | — | " |
| 4 | No protective carrier | D | 0.04 | 0.02 | P | — | " |
| 5 | No protective carrier | E | 0.03 | 0.02 | P | — | " |
| 6 | No protective carrier | F | 0.03 | 0.02 | P | — | " |
| 7 | (1) | A | 0.30 | 0.18 | E | E | " |
| 8 | " | B | 0.18 | 0.12 | E | E | " |
| 9 | " | C | 0.05 | 0.06 | E | E | Invention |
| 10 | " | D | 0.04 | 0.05 | E | E | " |
| 11 | " | E | 0.03 | 0.04 | E | E | " |
| 12 | " | F | 0.03 | 0.03 | E | E | " |
| 13 | (2) | A | 0.30 | 0.12 | E | F | Comparison |
| 14 | " | B | 0.18 | 0.10 | E | F | " |
| 15 | " | C | 0.05 | 0.05 | E | F | Invention |
| 16 | " | D | 0.04 | 0.04 | E | F | " |
| 17 | " | E | 0.03 | 0.03 | E | F | " |
| 18 | " | F | 0.03 | 0.03 | E | F | " |
| 19 | (3) | A | 0.30 | 0.10 | E | F | Comparison |
| 20 | " | B | 0.18 | 0.08 | E | F | " |
| 21 | " | C | 0.05 | 0.04 | E | F | Invention |
| 22 | " | D | 0.04 | 0.03 | E | F | " |
| 23 | " | E | 0.03 | 0.03 | E | F | " |
| 24 | " | F | 0.03 | 0.02 | E | F | " |
| 25 | (4) | A | 0.30 | 0.09 | E | E | Comparison |
| 26 | " | B | 0.18 | 0.07 | E | E | " |
| 27 | " | C | 0.05 | 0.03 | E | E | Invention |
| 28 | " | D | 0.04 | 0.03 | E | E | " |
| 29 | " | E | 0.03 | 0.02 | E | E | " |
| 30 | " | F | 0.03 | 0.02 | E | E | " |

As can be seen in the results of Table 3, the combination of the heat-developable photosensitive materials C, D, E and F and the wrapping materials (1), (2), (3) and (4) makes it possible to obtain a good image preservability, little change of optical density and a good handleability in apparatus. In particular, the heat-developable photosensitive materials C, D, E and F, which have a silver behenate content of not lower than 53 mol %, unexpectedly give good results in image preservability and change of optical density.

EXAMPLE 2

(Preparation of PET Support)

Terephthalic acid and ethylene glycol were processed according to an ordinary method to obtain PET having an intrinsic viscosity (IV) of 0.66 as determined at 25° C. in a 6/4 by weight mixture of phenol and tetrachloroethane. PET thus obtained was pelletized, dried at a temperature of 130° C. for 4 hours, melted at a temperature of 300° C., extruded through a T-die, and then rapidly cooled to prepare an unstretched film having a thickness so as to be 175 μm after thermal fixing.

The unstretched film was longitudinally stretched 3.3 times by rolls having different peripheral speeds at a temperature of 110° C., and then crosswise stretched 4.5 times by a tenter at a temperature of 130° C. Thereafter, the film was thermally fixed at a temperature of 240° C. for 20 seconds, and then crosswise relaxed by 4% at the same temperature. Thereafter, the film was slit at the portion chucked by the tenter, knurled at both edges thereof, and then wound at a rate of 4 kg/cm$^2$ to obtain a rolled film having a thickness of 175 μm, (Surface Corona Treatment)

Using a 6KVA solid state corona treatment machine (produced by NIPPON PILLAR PACKING Co., Ltd.), the support was treated on both surfaces thereof at room temperature and a rate of 20 m/min. The resulting readout of current and voltage showed that the support had been treated at 0.375 kV·A·min/m$^2$. The frequency used during treatment was 9.6 kHz. The gap clearance between the electrode and the dielectric roll was 1.6 mm.

(Preparation of Undercoated Support)

(1) Preparation of undercoat layer coating solution

| Formulation (1) (for undercoat layer on photosensitive layer side) | |
|---|---|
| Pesresin A-520 (30 wt % solution) (produced by TAKAMATSU OIL & FAT CO., LTD.) | 59 g |
| 10 wt % solution of polyethylene glycol monononyl phenyl ether (average number of ethylene oxides: 8.5) | 5.4 g |
| MP-1000 (particulate polymer; average particle diameter: 0.4 μm) (produced by Soken Chemical & Engineering Co., Ltd.) | 0.91 g |
| Distilled water | 935 ml |
| Formulation (2) (for first layer on back side) | |
| Styrene-butadiene copolymer latex (solid content: 40 wt %; styrene/butadiene ratio by weight: 68/32) | 158 g |
| 8 wt % aqueous solution of 2,4-dichloro-6-hydroxy-S-triazine sodium salt | 20 g |
| 1 wt % aqueous solution of sodium laurylbenzene sulfonate | 10 ml |
| Distilled water | 854 ml |

-continued

| Formulation (3) (for second layer back side) | |
|---|---|
| $SnO_2$/SbO (9/1 weight ratio; average particle diameter: 0.038 μm; 17 wt % dispersion) | 84 g |
| 10 wt % aqueous solution of gelatin | 89.2 g |
| Metolose TC-5 (2 wt % aqueous solution) (produced by Shin-Etsu Chemical Co., Ltd.) | 8.6 g |
| MP-1000 (produced by Soken Chemical & Engineering Co., Ltd.) | 0.01 g |
| 1 wt % aqueous solution of sodium dodecylbenzene sulfonate | 10 ml |
| 1 wt % aqueous solution of NaOH | 6 ml |
| Proxel (produced by ICI) | 1 ml |
| Distilled water | 805 ml |

The biaxially-stretched polyethylene terephthalate support having a thickness of 175 μm was subjected to corona discharge treatment on both surfaces thereof as described above. Subsequently, the aforementioned undercoat layer coating solution (Formulation (1)) was applied to the support on one surface thereof (photosensitive layer side) in an amount of 6.6 ml/m$^2$ as calculated in terms of wet coat using a wire bar, and then dried at a temperature of 180° C. for 5 minutes. Subsequently, the aforementioned undercoat layer coating solution (Formulation (2)) was applied to the support on the back surface (back side) in an amount of 5.7 ml/m$^2$ as calculated in terms of wet coat using a wire bar, and then dried at a temperature of 180° C. for 5 minutes. Further, the aforementioned undercoat layer coating solution (Formulation (3)) was applied to the support on the back surface (back side) in an amount of 7.7 ml/m$^2$ as calculated in terms of wet coat using a wire bar, and then dried at a temperature of 180° C. for 6 minutes to prepare an undercoated support.

(Preparation of Back Layer Coating Solution)

<Preparation of Base Precursor Solid Fine Particle Dispersion (a)>

To a mixture of 1.5 kg of base precursor compound 1, 225 of a surface active agent (trade name: Demor N, produced by Kao Corp.), 937.5 g of diphenylsulfone and 15 g of butyl parahydroxybenzoate (trade name: Mekkins, produced by Ueno Fine Chemicals Industry, Ltd.) was added distilled water to make 5.0 kg. The mixture was then subjected to bead dispersion using a horizontal sandmill (UVM-2 produced by IMEX Co., Ltd.). For dispersion, the mixture was supplied by a diaphragm pump into UVM-2 filled with zirconia beads having an average diameter of 0.5 mm where it was then subjected to dispersion at an inner pressure of not lower than 50 hPa until a desired average particle diameter was obtained.

Dispersion was made until the ratio (D450/D650) of absorbance at 450 nm to absorbance at 650 nm in spectral absorption of dispersion reached 2.2 or higher. The dispersion thus obtained was diluted with distilled water to the base precursor concentration of 20% by weight, and then filtered through a polypropylene filter having an average pore diameter of 3 μm to remove dust before use.

<Preparation of Dye Solid Fine Particle Dispersion>

To a mixture of 6.0 kg of cyanine dye compound 1, 3.0 kg of sodium p-dodecylbenzenesulfonate, 0.6 kg of a surface active agent (Demor SNB produced by Kao Corp.) and 0.15 kg of an antifoaming agent (trade name: Surfynol 104E, produced by Nisshin Chemical Co., Ltd.) was then distilled water to make 60 kg. The mixture was then subjected to dispersion with zirconia beads having a diameter of 0.5 mm using a horizontal sandmill (UVM-2 produced by IMEX Co., Ltd.).

Dispersion was made until the ratio (D650/D750) of absorbance at 650 nm to absorbance at 750 nm in spectral absorption of dispersion reached 5.0 or higher. The dispersion thus obtained was diluted with distilled water to the cyanine dye concentration of 6% by weight, and then filtered through a filter having an average pore diameter of 1 μm to remove dust before use.

<Preparation of Antihalation Layer Coating Solution>

30 g of gelatin, 24.5 g of a polyacrylamide, 2.2 g of 1 mol/l caustic soda, 2.4 g of a monodisperse emulsion of polymethyl methacrylate particles (average particle size: 8 μm; standard deviation of particle diameters: 0.4), 0.08 g of benzoisothiazoline, 35.9 g of the aforementioned dye solid fine particle dispersion, 74.2 g of the aforementioned base precursor solid fine particle dispersion (a), 0.6 g of sodium polyethylenesulfonate, 0.21 g of blue dye compound 1, 0.15 g of yellow dye compound 1, and 8.3 g of an acrylic acid/ethyl acrylate copolymer latex (copolymerization ratio: 5/95) were mixed. To the mixture was added water to make 8, 183 ml to prepare an antihalation layer coating solution.

<Preparation of Back Layer Protective Layer Coating Solution>

40 g of gelatin, 1.5 g (as calculated in terms of liquid paraffin) of a liquid paraffin emulsion, 35 mg of benzoisothiazoline, 6.8 g of 1 mol/l caustic soda, 0.5 g of sodium tert-octylpheoxyethoxyethanesulfonate, 0.27 g of sodium polystyenesulfonate, 37 mg of a fluorine-based surface active agent (F-1: N-perfluorooctylsulfonyl-N-propylalanine potassium salt), 150 mg of a fluorine-based surface active agent (F-2: polyethylene glycol mono(N-perfluorooctylsulfonyl-N-propyl-2-aminoethyl)ether (average ethylene oxide polymerization degree: 15)), 64 mg of a fluorine-based surface active agent (F-3), 32 mg of a fluorine-based surface active agent (F-4), 6.0 g of an acrylic acid/ethyl acrylate copolymer (copolymerization ratio: 5/95 by weight), and 2.0 g of N,N-ethylenebis (vinylsulfonacetamide) were mixed in a vessel which had been kept at a temperature of 40° C. To the mixture was added water to make 10 l to prepare a back layer protective layer coating solution.

(Preparation of Silver Halide Emulsion)

<Preparation of Silver Halide Emulsion 1>

To 142 ml of distilled water was added 3.1 ml of a 1 weight % potassium bromide solution. To the mixture were then added 3.5 ml of a 0.5 mol/l sulfuric acid and 31.7 g of phthalated gelatin. To the solution thus prepared were then added solution A obtained by diluting 22.22 g of silver nitrate with distilled water to a volume of 95.4 ml and solution B obtained by diluting 15.3 g of potassium bromide and 0.8 g of potassium iodide with distilled water to a volume of 97.4 ml at a constant flow rate while the liquid temperature was being kept to 30° C. for 45 seconds. Thereafter, to the solution was added 10 ml of a 3.5 weight % aqueous solution of hydrogen peroxide. To the solution was then added 10.8 ml of a 10 weight % aqueous solution of benzoimidazole. To the solution were then added solution C obtained by diluting 51.86 g of silver nitrate with distilled water to a volume of 317.5 ml and solution D obtained by diluting 44.2 g of potassium bromide and 2.2 g of potassium iodide with distilled water to a volume of 400 ml by a controlled double jet process at a constant flow rate for 20 minutes and with the pAg value thereof being kept at 8.1, respectively. During the procedure, potassium hexachloroiridate (III) was added in an amount of $1\times10^{-4}$ mol per mol of silver 10 minutes after the beginning of the addition of the solutions C and D. After 5 seconds from the termination of the addition of the solution C, an aqueous solution of potassium hexacyanoferrite (II) was added in an amount of $3\times10^{-4}$ mols per mol of silver. The mixture was then adjusted with a 0.5 mol/l sulfuric acid to pH 3.8. Stirring was then stopped. The mixture was then subjected to sedimentation, desalting and rinsing. The mixture was then adjusted with a 1 mol/l sodium hydroxide to pH 5.9 to prepare a silver halide dispersion having pAg 8.0.

To the silver halide dispersion was then added 5 ml of a 0.34 weight % methanol solution of 1,2-benzoisothiazolin-3-one with stirring while the temperature thereof was being kept at 38° C. After 40 minutes, to the mixture was then added a methanol solution of a 1:1 by mole mixture of spectral sensitizing dye A and sensitizing dye B in an amount of $1.2\times10^{-3}$ mols per mol of silver as calculated in terms of sum of the spectral sensitizing dyes A and B. After 1 minute, the mixture was heated to a temperature of 47° C. After 20 minutes, to the mixture was then added sodium benzenesulfonate in the form of methanol solution in an amount of $7.6\times10^{-5}$ mols per mol of silver. After 5 minutes, to the mixture was then added tellurium sensitizer C in the form of methanol solution in an amount of $2.9\times10^{-4}$ mols per mol of silver. The mixture was then ripened for 91 minutes. To the mixture was then added 1.3 ml of a 0.8 weight % methanol solution of N,N'-dihydroxy-N"-diethylmelamine. After 4 minutes, to the mixture were then added 5-methyl-2-mercaptobenzimidazole in the form of methanol solution in an amount of $4.8\times10^{-3}$ mols per mol of silver and 1-phenyl-2-heptyl-5-mercapto-1,3,4-triazole in the form of methanol solution in an amount of $5.4\times10^{-3}$ mols per mol of silver to prepare silver halide emulsion 1.

The particles in the silver halide emulsion thus prepared were silver iodobromide particles uniformly containing 3.5 mol % of iodide having an average diameter of 0.042 μm as calculated in terms of sphere and a diameter variation coefficient of 20% as calculated in terms of sphere. The particle size and other factors were obtained by averaging the value of 1,000 particles under electron microscope. The {100} plane proportion of the particles was found to be 80% as determined by Kubelka-Munk method.

<Preparation of Silver Halide Emulsion 2>

Silver halide emulsion 2 was prepared in the same manner as for the silver halide emulsion 1 except that the liquid temperature during the formation of particles was changed from 30° C. to 47° C., the solution B was prepared by diluting 15.9 g of potassium bromide with distilled water to a volume of 97.4 ml, the solution D was prepared by diluting 45.8 g of potassium bromide with distilled water to a volume of 400 ml, the addition time of the solution C was changed to 30 minutes, and potassium hexacyanoferrite (II) was not added. The mixture thus prepared was then subjected to sedimentation, desalting, rinsing and dispersion in the same manner as for the silver halide emulsion 1. The emulsion was then subjected to spectral sensitization, chemical sensitization and addition of 5-methyl-2-mercaptobenzimidazole and 1-phenyl-2-heptyl-5-mercapto-1,3,4-triazole except that the added amount of the methanol solution of a 1:1 by mole mixture of the spectral sensitizing dye A and the spectral sensitizing dye B was changed to $7.5\times10^{-4}$ mols per mol of silver as calculated in terms of sum of the spectral sensitizing dyes A and B, the added amount of tellurium sensitizer C was changed to $1.1\times10^{-4}$ mols per mol of silver, and the added amount of 1-phenyl-2-heptyl-5-mercapto-1,3,4-triazole was changed to $3.3\times10^{-3}$ mols per mol of silver. Thus, the silver halide emulsion 2 was obtained. The particles in the silver halide emulsion 2 were cubic particles of pure silver bromide having an average diameter of 0.080 μm as calculated in terms of sphere and a particle diameter variation coefficient of 20% as calculated in terms of sphere.

<Preparation of Silver Halide Emulsion 3>

A silver halide emulsion 3 was prepared in the same manner as for the silver halide emulsion 1 except that the liquid temperature during the formation of particles was changed from 30° C. to 27° C. The mixture thus prepared was then subjected to sedimentation, desalting, rinsing and dispersion in the same manner as for the silver halide emulsion 1. The mixture was then processed in the same manner as for the emulsion 1 except that a solid dispersion (aqueous solution of gelatin) of a 1:1 by mole mixture of the spectral sensitizing dye A and the spectral sensitizing dye B was used in an amount of $6\times10^{-3}$ mols per mol of silver as calculated in terms of sum of the spectral sensitizing dyes A and B, the added amount of the tellurium sensitizer C was changed to $5.2\times10^{-4}$ mols per mol of silver, and bromoauric acid and potassium thiocyanate were added in an amount of $5\times10^{-4}$ mols and $2\times10^{-3}$ mols per mol of silver, respectively, after 3 minutes from the addition of the tellurium sensitizer. The particles in the silver halide emulsion 3 were silver iodobromide particles uniformly containing 3.5 mol % of iodide having an average particle diameter of 0.034 μm as calculated in terms of sphere and a particle diameter variation coefficient of 20% as calculated in terms of sphere.

<Preparation of Mixed Emulsion A for Coating Solution>

The silver halide emulsions 1, 2 and 3 were dissolved in an amount of 70% by weight, 15% by weight and 15% by weight, respectively. To the mixture was then added benzothiazolium iodide in the form of a 1% by weight aqueous solution in an amount of $7\times10^{-3}$ mols per mol of silver. To the mixture was then added water in such an amount that the content of silver halide in 1 kg of mixed emulsion for coating solution was 38.2 g as calculated in terms of silver.

<Preparation of Silver Salt of Fatty Acid Dispersion A>

87.6 kg of behenic acid (trade name: Edenor C22-85R, produced by Henkel Japan Co., Ltd.), 423 l of distilled water, 49.2 l of a 5 mol/l aqueous solution of NaOH and 120 l of tert-butyl alcohol were mixed. The mixture was then stirred at a temperature of 75° C. for 1 hour so that it was reacted to obtain sodium behenate solution A. Separately, 206.2 l of an aqueous solution of 40.4 kg of silver nitrate (pH 4.0) was prepared and kept at a temperature of 10° C. To 635 l of distilled water and 30 l of tert-butyl alcohol in a reaction vessel which had been kept at a temperature of 30° C. were added all the amount of the sodium behenate solution A previously prepared and all the amount of the aqueous solution of silver nitrate previously prepared at a constant flow rate in 93 minutes and 15 seconds and in 90 minutes, respectively, with thorough stirring. During the procedure, only the aqueous solution of silver nitrate was added for 11 minutes from the beginning of the addition of aqueous solution of silver nitrate. Thereafter, the addition of the sodium behenate solution A began. Only the sodium behenate solution A was added for 14 minutes and 15 seconds from the termination of addition of aqueous solution of silver nitrate. During the procedure, the temperature in the reaction vessel was 30° C. and the ambient temperature was controlled such that the liquid temperature was kept constant. The piping in the system for the addition of the sodium behenate solution A was kept at a constant temperature by circulating hot water through the outer pipe in a double pipe, and the liquid temperature at the outlet of the injection nozzle was adjusted to 75° C. The piping in the system for the addition of the aqueous solution of silver nitrate was kept at a constant temperature by circulating cold water through the outer piper in a double pipe. The position at which the sodium behenate solution A was added and the position at which the aqueous solution of silver nitrate was added was asymmetric about the axis of stirring. The two addition positions were adjusted high enough not to come in contact with the reaction solution.

After the termination of addition of sodium behenate solution A, the emulsion was allowed to stand at the same temperature with stirring for 20 minutes, then heated to a temperature of 35° C. over a period of 30 minutes, and ripened for 210 minutes. Shortly after the termination of ripening, the emulsion was then subjected to centrifugal filtration to separate the solid content which was then rinsed until the electrical conductance of the filtrate reached 30 μS/cm. Thus, silver salt of fatty acid was obtained. The solid content thus obtained was then stored without drying in the form of wet cake.

The form of the silver behenate particles thus obtained was then evaluated by electron microphotography. As a result, the silver behenate was found to be a scaly crystal having a side a of 0.14 μm, a side b of 0.4 μm and a side c of 0.6 μm on the average, an average aspect ratio of 5.2, an average particle diameter of 0.52 μm as calculated in terms of sphere and a particle diameter variation coefficient of 15% as calculated in terms of sphere (a, b and c are defined hereinbefore).

To the wet cake in a dry solid content of 260 kg was then added 19.3 kg of a polyvinyl alcohol (trade name: PVA-217). To the mixture was then added water to make 1,000 kg. The mixture was then slurried by means of a dissolver blade. The mixture was then subjected to previous dispersion using a pipe line mixer (PM-10 produced by MIZUHO Industrial Co., Ltd.).

Subsequently, the raw liquid which had thus been previously dispersed was processed three times by means of a dispersing machine (trade name: Microfluidizer M-610, produced by Microfluidex International Corporation; equipped with a Z type interaction chamber) the pressure in which had been adjusted to 1,260 kg/cm$^2$ to obtain a silver behenate dispersion. In order to cool the system, the interaction chamber was provided with spiral heat exchangers in front and rear thereof. By adjusting the temperature of the medium, the dispersion temperature was kept at 18° C.

<Preparation of Silver Salt of Fatty Acid Dispersion B>

<<Preparation of Recrystallized Behenic Acid>>

100 kg of behenic acid (trade name: Edenor C22-85R, produced by Henkel Japan Co., Ltd.) was mixed with 1,200 kg of isopropyl alcohol. The mixture was then subjected to dissolution at a temperature of 50° C. The solution was filtered through a filter having a pore diameter of 10 μm, and then cooled to a temperature of 30° C. so that it was recrystallized. During the recrystallization procedure, the cooling rate was controlled to 3° C./hr. The resulting crystal was subjected to centrifugal filtration, washed with 100 kg of isopropyl alcohol, and then dried. The crystal thus obtained was esterified, and then subjected to GC-FID measurement. As a result, the crystal was found to have a behenic acid content of 96%, a lignoceric acid content of 2% and an arachidic acid content of 2%.

<<Preparation of Silver Salt of Fatty Acid Dispersion B>>

88 kg of the recrystallized behenic acid, 422 l of distilled water, 49.2 l of a 5 mol/l aqueous solution of NaOH, and 120 l of tert-butyl alcohol were mixed. The mixture was then stirred at a temperature of 75° C. for 1 hour so that it was reacted to obtain sodium behenate solution B. Separately, 206.2 l of an aqueous solution of 40.4 kg of silver nitrate (pH 4.0) was prepared and kept at a temperature of 10° C. To 635 l of distilled water and 30 l of tert-butyl alcohol in a reaction vessel which had been kept at a temperature of 30° C. were added all the amount of the sodium behenate solution B previously prepared and all the amount of the aqueous solution of silver nitrate previously prepared at a constant flow rate in 93 minutes and 15 seconds and in 90 minutes, respectively, with thorough stirring. During the procedure, only the aqueous solution of silver nitrate was added for 11 minutes from the beginning of the addition of aqueous solution of silver nitrate. Thereafter, the addition of the sodium behenate solution B began. Only the sodium behenate solution B was added for 14 minutes and 15 seconds from the termination of addition of the aqueous solution of silver nitrate. During the procedure, the temperature in the reaction vessel was 30° C. and the ambient temperature was controlled such that the liquid temperature was kept constant. The piping in the system for the addition of the sodium behenate solution B was kept at a constant temperature by circulating hot water through the outer pipe in a double pipe, and the liquid temperature at the outlet of the injection nozzle was adjusted to 75° C. The piping in the system for the addition of the aqueous solution of silver nitrate was kept at a constant temperature by circulating cold water through the outer piper in a double pipe. The position at which the sodium behenate solution B was added and the position at which the aqueous solution of silver nitrate was added was asymmetric about the axis of stirring. The two addition positions were adjusted high enough not to come in contact with the reaction solution.

After the termination of addition of sodium behenate solution B, the emulsion was allowed to stand at the same temperature with stirring for 20 minutes, then heated to a temperature of 35° C. over a period of 30 minutes, and ripened for 210 minutes. Shortly after the termination of ripening, the emulsion was then subjected to centrifugal filtration to separate the solid content which was then rinsed until the electrical conductance of the filtrate reached 30 μS/cm. Thus, silver salt of fatty acid was obtained. The solid content thus obtained was then stored without drying in the form of wet cake.

The form of the silver behenate particles thus obtained was then evaluated by electron microphotography. As a result, the silver behenate was found to be a crystal having a side a of 0.21 μm, a side b of 0.4 μm and a side c of 0.4 μm on the average, an average aspect ratio of 2.1, an average particle diameter of 0.51 μm as calculated in terms of sphere and a particle diameter variation coefficient of 11% as calculated in terms of sphere (a, b and c are defined hereinbefore).

To the wet cake in a dry solid content of 260 kg was then added 19.3 kg of a polyvinyl alcohol (trade name: PVA-217).

To the mixture was then added water to make 1,000 kg. The mixture was then slurried by means of a dissolver blade. The mixture was then subjected to previous dispersion using a pipe line mixer (PM-10 produced by MIZUHO Industrial Co., Ltd.).

Subsequently, the raw liquid which had thus been previously dispersed was processed three times by means of a dispersing machine (trade name: Microfluidizer M-610, produced by Microfluidex International Corporation; equipped with a Z type interaction chamber) the pressure in which had been adjusted to $1.13\times10^5$ kPa (1,150 kg/cm$^2$) to obtain a silver behenate dispersion. In order to cool the system, the interaction chamber was provided with spiral heat exchangers in front and rear thereof. By adjusting the temperature of the medium, the dispersion temperature was kept at 18° C.

(Preparation of Reducing Agent Dispersion)

<Preparation of Dispersion of Reducing Agent Complex 1>

To 10 kg of reducing agent complex 1 (1:1 complex of 6,6'-di-tert-butyl-4,4'-dimethyl-2,2'-butylidene diphenol and triphenylphosphine oxide), 0.12 kg of triphenylphosphine oxide and 16 kg of a 10 weight % aqueous solution of a modified polyvinyl alcohol (Poval MP203, produced by KURARAY CO., LTD.) was added 10 kg of water. The mixture was then thoroughly stirred to obtain a slurry. The slurry was supplied by a diaphragm pump into a horizontal sandmill (UVM-2 produced by IMEX Co., Ltd.) filled with zirconia beads having an average diameter of 0.5 mm where it was then dispersed for 4 hours and 30 minutes. To the dispersion were then added 0.2 g of benzoisothiazoline sodium salt and water to a reducing agent complex concentration of 22% by weight to obtain a dispersion of reducing agent complex 1. The particles in the reducing agent complex dispersion thus obtained had a median diameter of 0.45 μm and a maximum particle diameter of not greater than 1.4 μm. The reducing agent complex dispersion thus obtained was filtered through a polypropylene filter having a pore diameter of 3.0 μm to remove foreign matters such as dust, and then stored.

<Preparation of Dispersion of Reducing Agent 2>

To 10 kg of reducing agent 2 (6,6'-di-tert-butyl-4,4'-dimethyl-2,2'-butylidenediphenol) and 16 kg of a 10 weight % aqueous solution of a modified polyvinyl alcohol (Poval MP203, produced by KURARAY CO., LTD.) was added 10 kg of water. The mixture was then thoroughly stirred to obtain a slurry. The slurry was supplied by a diaphragm pump into a horizontal sandmill (UVM-2 produced by IMEX Co., Ltd.) filled with zirconia beads having an average diameter of 0.5 mm where it was then dispersed for 3 hours and 30 minutes. To the dispersion were then added 0.2 g of benzoisothiazoline sodium salt and water to a reducing agent concentration of 25% by weight to obtain a dispersion of reducing agent 2. The particles in the reducing agent dispersion thus obtained had a median diameter of 0.40 μm and a maximum particle diameter of not greater than 1.5 μm. The reducing agent dispersion thus obtained was filtered through a polypropylene filter having a pore diameter of 3.0 μm to remove foreign matters such as dust, and then stored.

<Preparation of Dispersion of Hydrogen Bond-Forming Compound 1>

To 10 kg of hydrogen bond-forming compound 1 (tri(4-tert-butylphenyl)phosphine oxide) and 16 kg of a 10 weight % aqueous solution of a modified polyvinyl alcohol (Poval MP203, produced by KURARAY CO., LTD.) was added 10 kg of water. The mixture was then thoroughly stirred to obtain a slurry. The slurry was supplied by a diaphragm pump into a horizontal sandmill (UVM-2 produced by IMEX Co., Ltd.) filled with zirconia beads having an average diameter of 0.5 mm where it was then dispersed for 3 hours and 30 minutes. To the dispersion were then added 0.2 g of benzoisothiazoline sodium salt and water to a hydrogen-bonded compound concentration of 25% by mass to obtain a dispersion of hydrogen bond-forming compound 1. The particles in the hydrogen bond-forming compound dispersion thus obtained had a median diameter of 0.35 μm and a maximum particle diameter of not greater than 1.5 μm. The hydrogen bond-forming compound dispersion thus obtained was filtered through a polypropylene filter having a pore diameter of 3.0 μm to remove foreign matters such as dust, and then stored.

<Preparation of Dispersion of Development Accelerator 1>

To 10 kg of development accelerator 1 and 20 kg of a 10 weight % aqueous solution of a modified polyvinyl alcohol (Poval MP203, produced by KURARAY CO., LTD.) was added 10 kg of water. The mixture was then thoroughly stirred to obtain a slurry. The slurry was supplied by a diaphragm pump into a horizontal sandmill (UVM-2 produced by IMEX Co., Ltd.) filled with zirconia beads having an average diameter of 0.5 mm where it was then dispersed for 3 hours and 30 minutes. To the dispersion were then added 0.2 g of benzoisothiazoline sodium salt and water to a development accelerator concentration of 20% by weight to obtain a dispersion of development accelerator 1. The particles in the development accelerator dispersion thus obtained had a median diameter of 0.48 μm and a maximum particle diameter of not greater than 1.4 μm. The development accelerator dispersion thus obtained was filtered through a polypropylene filter having a pore diameter of 3.0 μm to remove foreign matters such as dust, and then stored.

With respect to development accelerator 2, development accelerator 3 and color toner 1, solid dispersion was conducted in the same manner as for development accelerator 1 to obtain a 20 weight % dispersion.

(Preparation of Polyhalogen Compound)

<Preparation of Dispersion of Organic Polyhalogen Compound 1>

To 10 kg of organic polyhalogen compound 1 (tribromomethanesulfonylbenzene), 10 kg of a 20 weight % aqueous solution of a modified polyvinyl alcohol (Poval MP203, produced by KURARAY CO., LTD.) and 0.4 kg of a 20 weight % aqueous solution of sodium triisopropylnaphthalenesulfonate was added 14 kg of water, and the mixture was thoroughly stirred to obtain a slurry. The slurry was supplied by a diaphragm pump into a horizontal sandmill (UVM-2 produced by IMEX Co., Ltd.) filled with zirconia beads having an average diameter of 0.5 mm where it was then dispersed for 5 hours. To the dispersion were then added 0.2 g of benzoisothiazoline sodium salt and water to an organic polyhalogen compound concentration of 26% by weight to obtain a dispersion of organic polyhalogen compound 1. The particles in the polyhalogen compound dispersion thus obtained had a median diameter of 0.41 μm and a maximum particle diameter of not greater than 2.0 μm. The organic polyhalogen compound dispersion thus obtained was filtered through a polypropylene filter having a pore diameter of 10.0 μm to remove foreign matters such as dust, and then stored.

<Preparation of Dispersion of Organic Polyhalogen Compound 2>

To 10 kg of organic polyhalogen compound 2 (N-butyl-3-tribromomethanesulfonylbenzamide) and 20 kg of a 10 weight % aqueous solution of a modified polyvinyl alcohol (Poval MP203, produced by KURARAY CO., LTD.), 0.4 kg of a 20 weight % aqueous solution of sodium triisopropylnaphthalenesulfonate was added, and the mixture was thoroughly stirred to obtain a slurry. The slurry was supplied by a diaphragm pump into a horizontal sandmill (UVM-2 produced by IMEX Co., Ltd.) filled with zirconia beads having an average diameter of 0.5 mm where it was then dispersed for 5 hours. To the dispersion were then added 0.2 g of benzoisothiazoline sodium salt and water to an organic polyhalogen compound concentration of 30% by weight to obtain a dispersion of organic polyhalogen compound 2. The particles in the polyhalogen compound dispersion thus obtained had a median diameter of 0.40 μm and a maximum particle diameter of not greater than 1.3 μm. The organic polyhalogen compound dispersion thus obtained was filtered through a polypropylene filter having a pore diameter of 3.0 μm to remove foreign matters such as dust, and then stored.

<Preparation of Solution of Phthalazine Compound 1>

8 kg of a modified polyvinyl alcohol (MP203 produced by KURARAY CO., LTD.) was dissolved in 174.57 kg of water. Subsequently, to the solution were added 3.15 kg of a 20 weight % aqueous solution of sodium triisopropylnaphthalenesulfonate and 14.28 kg of a 70 weight % aqueous solution of phthalazine compound 1 (6-isopropylphthalazine) to prepare a 5 weight % solution of phthalazine compound 1.

(Preparation of Solution of Mercapto Compound)

<Preparation of Aqueous Solution of Mercapto Compound 1>

7 g of mercapto compound 1 (1-(3-sulfophenyl)-5-mercaptotetrazole sodium salt) was dissolved in 993 g of water to obtain a 0.7 weight % aqueous solution.

<Preparation of Aqueous Solution of Mercapto Compound 2>

20 g of mercapto compound 2 (1-(3-methylureido)-5-mercaptotetrazole sodium salt) was dissolved in 980 g of water to obtain a 2.0 weight % aqueous solution.

<Preparation of Dispersion of Pigment 1>

To 64 g of C. I. Pigment Blue 60 and 6.4 g of Demor N (produced by Kao Corp.) as added 250 g of water. The mixture was then thoroughly stirred to obtain a slurry. 800 g of zirconia beads having an average diameter of 0.5 mm were put into a vessel with the slurry. The mixture was then subjected to dispersion using a dispersing machine (1/4G sandgrinder mill, produced by IMEX Co., Ltd.) for 25 hours to obtain a dispersion of pigment 1. The particulate pigment contained in the pigment dispersion thus obtained had an average particle diameter of 0.21 μm.

<Preparation of SBR Latex Solution>

SBR latex having Tg of 22° C. was prepared in the following manner.

70.0 by mass of styrene, 27.0 by mass of butadiene and 3.0 by mass of acrylic acid were subjected to emulsion polymerization in the presence of ammonium persulfate as a polymerization initiator and an anionic surface active agent as an emulsifier, and then aged at a temperature of 80° C. for 8 hours. Thereafter, the emulsion was cooled to a temperature of 40° C., and then adjusted with aqueous ammonia to pH 7.0. To the emulsion was then added Sandet BL (produced by Sanyo Chemical Industries, Ltd.) so as to be concentration of 0.22%. Subsequently, to the emulsion was added a 5% aqueous solution of sodium hydroxide to make pH 8.3. The emulsion was then adjusted with aqueous ammonia to pH 8.4. The molar ratio of $Na^+$ ion and $NH_4^+$ ion used was 1:2.3. To 1 kg of the solution was then added 0.15 ml of a 7% aqueous solution of benzoisothiazolinone sodium salt to prepare an SBR latex solution. (SBR latex: latex of -St(70.0)-Bu(27.0)-AA(3.0)-) Tg: 22° C.; average particle diameter: 0.1 μm; concentration: 43% by weight;

equilibrium water content at 25° C. and 60% RH: 0.6% by weight; ion conductance: 4.2 mS/cm (as measured in the latex stock solution (43% by weight) at 25° C. using a conductance meter (CM-30S produced by DKK-TOA CORPORATION); pH: 8.4

SBR latexes having Tg different from the above value can be prepared by the same method as described above except that the proportion of styrene and butadiene is appropriately changed.

<Preparation of Emulsion Layer (Photosensitive Layer) Coating Solution 1>

To 1,000 g of the dispersion of silver salt of fatty acid were added sequentially 276 ml of water, 33.2 g of the dispersion of pigment 1, 21 g of the dispersion of organic polyhalogen compound 1, 58 g of the dispersion of organic polyhalogen compound 2, 173 g of the solution of phthalazine compound 1, 1,082 g of the SBR latex (Tg: 22° C.) solution, 299 g of the dispersion of reducing agent complex 1, 6 g of the dispersion of development accelerator 1, 9 ml of the solution of mercapto compound 1 and 27 ml of the solution of mercapto compound 2. Immediately before coating, to the mixture was added 117 g of the mixed silver halide emulsion A. The mixture was then thoroughly stirred to obtain an emulsion layer coating solution which was then supplied into a coating die for coating.

The viscosity of the aforementioned emulsion layer coating solution was 25 [mPa·s] at 40° C. as measured by a Brookfield viscometer (No. 1 rotor, 60 rpm) produced by Tokyo Keiki Kogyo K.K.

The viscosity of the coating solution at 25° C. as measured by means of a RFS fluid spectrometer produced by RHEOMETRICS FAR EAST LTD. was 230 at 0.1 [1/sec], 60 at 1 [1/sec], 46 at 10 [1/sec], 24 at 100 [1/sec] and 18 at 1,000 [1/sec] as calculated in terms of shear rate.

The content of zirconium in the coating solution was 0.38 mg per g of silver.

<Preparation of Emulsion Layer (Photosensitive Layer) Coating Solution 2>

To 1,000 g of the dispersion of silver salt of fatty acid were added sequentially 276 ml of water, 32.8 g of the dispersion of pigment 1, 21 g of the dispersion of organic polyhalogen compound 1, 58 g of the dispersion of organic polyhalogen compound 2, 173 g of the solution of phthalazine compound 1, 1,082 g of the SBR latex (Tg: 20° C.) solution, 155 g of the dispersion of reducing agent 2, 55 g of the dispersion of hydrogen bond-forming compound 1, 6 g of the dispersion of development accelerator 1, 2 g of the dispersion of development accelerator 2, 3 g of the dispersion of development accelerator 3, 2 g of the dispersion of toning agent 1 and 6 ml of the aqueous solution of mercapto compound 2. Immediately before coating, to the mixture was added 117 g of the mixed silver halide emulsion A. The mixture was then thoroughly stirred to obtain an emulsion layer coating solution which was then supplied into a coating die for coating.

The viscosity of the aforementioned emulsion layer coating solution was 40 [mPa·s] at 40° C. as measured by a Brookfield viscometer (No. 1 rotor, 60 rpm) produced by Tokyo Keiki Kogyo K.K.

The viscosity of the coating solution at 25° C. as measured by means of a RFS fluid spectrometer produced by RHEOMETRICS FAR EAST LTD. was 530 at 0.1 [1/sec], 144 at 1 [1/sec], 96 at 10 [1/sec], 51 at 100 [1/sec] and 28 at 1,000 [1/sec] as calculated in terms of shear rate.

The content of zirconium in the coating solution was 0.25 mg per g of silver.

<Preparation of Emulsion Layer Side Interlayer Coating Solution>

To 1,000 g of polyvinyl alcohol (PVA-205 produced by KURARAY CO., LTD.), 4,200 ml of a 19 weight % solution of methyl methacrylate/styrene/butyl acrylate/hydroxyethyl methacrylate/acrylic acid copolymer (copolymerization ratio: 64/9/20/5/2 by weight) latex, 27 ml of a 5 weight % aqueous solution of Aerosol 0T (produced by American Cyanamid Company) and 135 ml of a 20 weight % aqueous solution of diammonium phthalate was added water to make 10,000 g. The emulsion was then adjusted with NaOH to pH 7.5 to prepare an interlayer coating solution which was then supplied into a coating die to provide coverage of 9.1 ml/$m^2$.

The viscosity of the coating solution was 58 [mPa·s] at 40° C. as measured by a Grookfield viscometer (No: 1 rotor, 60 rpm).

<Preparation of Coating Solution of Emulsion Layer Side First Protective Layer>

64 g of inert gelatin was dissolved in water. To the solution were then added 80 g of a 27.5 weight % solution of methyl methacrylate/styrene/butyl acrylate/hydroxyethyl methacrylate/acrylic acid copolymer (copolymerization ratio: 64/9/20/5/2 by weight) latex, 23 ml of a 10 weight % methanol solution of phthalic acid, 23 ml of a 10 weight % aqueous solution of 4-methylphthalic acid, 28 ml of a 0.5 mol/l sulfuric acid, 5 ml of a 5 weight % aqueous solution of Aerosol OT (produced by American Cyanamid Company), 0.5 g of phenoxy ethanol and 0.1 g of benzisothiazolinone. To the mixture was then added water to make 750 g. Thus, a coating solution was prepared. Immediately before coating, the coating solution was mixed with 26 ml of a 4 weight % chrome alum by means of a static mixer. The mixture was then supplied into a coating die to provide coverage of 18.6 ml/$m^2$.

The viscosity of the coating solution was 20 [mpa·s] at 40° C. as measured by a Grookfield viscometer (No. 1 rotor, 60 rpm).

<Preparation of Coating Solution of Emulsion Layer Side Second Protective Layer>

80 g of inert gelatin was dissolved in water. To the solution were then added 102 g of a 27.5 weight % solution of methyl methacrylate/styrene/butyl acrylate/hydroxyethyl methacrylate/acrylic acid copolymer (copolymerization ratio: 64/9/20/5/2 by weight) latex, 3.2 ml of a 5 weight % solution of a fluorine-based surface active agent (F-1: N-perfluorooctylsulfonyl-N-propylalanine potassium salt), 32 ml of a 2 weight % aqueous solution of a fluorine-based surface active agent (F-2: polyethylene glycol mono(N-perfluorooctylsulfonyl-N-propyl-2-aminoethyl)ether (average ethylene oxide polymerization degree: 15)), 23 ml of a 5 weight % aqueous solution of Aerosol OT (produced by American Cyanamid Company), 4 g of a particulate polymethyl methacrylate (average particle diameter: 0.7 μm), 21 g of a particulate polymethyl methacrylate (average particle diameter: 4.5 μm), 1.6 g of 4-methylphthalic acid, 44 ml of a 0.5 mol/l sulfuric acid and 10 mg of benzisothiazolinone. To the mixture was then added water to make 650 g. Immediately before coating, the solution was mixed with 445 ml of an aqueous solution containing 4% by weight of chrome alum and 0.67% by weight of phthalic acid by means of a static mixer to prepare a surface protective layer coating solution which was then supplied into a coating die to provide coverage of 8.3 ml/$m^2$.

The viscosity of the coating solution was 19 [mPa·s] at 40° C. (No. 1 rotor, 60 rpm) as measured by a Grookfield viscometer (No. 1 rotor, 60 rpm).

(Preparation of Heat-Developable Photosensitive Material 1)

The back side of the aforementioned undercoated support was coated simultaneously with the antihalation layer coating solution and the back layer side protective layer coating solution in such an amount that the coated amount of solid content of solid sine particulate dye and the coated amount of gelatin reached 0.04 g/m$^2$ and 1.7 g/m$^2$, respectively, and then dried to form a back layer thereon.

The undercoated support was then coated on the side thereof opposite the back layer simultaneously with the emulsion layer coating solution, the interlayer coating solution, the first protective layer coating solution and the second protective layer coating solution in this order by a slide bead coating method to prepare a heat-developable photosensitive material sample. During the procedure, the emulsion layer coating solution and the interlayer coating solution were conditioned to 31° C., the first protective layer coating solution was conditioned to 36° C., and the second protective layer coating solution was conditioned to 37° C.

The coated amounts (g/m$^2$) of the various compounds of the emulsion layer were as follows:

| | |
|---|---|
| Silver behenate | 5.55 |
| Pigment (C. I. Pigment Blue 60) | 0.036 |
| Polyhalogen compound 1 | 0.12 |
| Polyhalogen compound 2 | 0.37 |
| Phthalazine compound 1 | 0.19 |
| SBR latex | 9.97 |
| Reducing agent complex 1 | 1.41 |
| Development accelerator 1 | 0.024 |
| Mercapto compound 1 | 0.002 |
| Mercapto compound 2 | 0.012 |
| Silver halide (as Ag) | 0.091 |

The coating and drying conditions were as follows:

Coating was effected at a rate of 160 m/min. The clearance between the tip of the coating die and the support was from 0.10 mm to 0.30 mm. The pressure in the vacuum chamber was predetermined to be from 196 to 882 Pa lower than the atmospheric pressure. The support was destaticized with ionized air before coating.

The coated support was cooled with air at a dry-bulb temperature of from 10 to 20° C. in the subsequent chilling zone, conveyed uncontacted, and then dried with dried air at a dry-bulb temperature of from 23 to 45° C. and a wet-bulb temperature of from 15 to 21° C. in a helical non-contact dryer.

The coated support thus dried was moisture-conditioned at 25° C. and a humidity of from 40 to 60% RH, and then heated to a temperature of from 70 to 90° C. on the surface thereof. Thereafter, the surface of the support was cooled to 25° C.

The mattness of the heat-developable photosensitive material thus prepared was 550 seconds and 130 seconds on the photosensitive layer side thereof and on the back layer side thereof, respectively, as calculated in terms of Bekk smoothness. The heat-developable photosensitive material was also measured for pH on the photosensitive layer side thereof. It was found to be 6.0.

(Preparation of Heat-Developable Photosensitive Material 2)

A heat-developable photosensitive material 2 was prepared in the same manner as for the heat-developable photosensitive material 1 except that the emulsion layer coating solution 1 was replaced by the emulsion layer coating solution 2, the antihalation layer coating solution was free from yellow dye compound 1, and the fluorine-based surface active agents F-1, F-2, F-3 and F-4 of the back layer side protective layer coating solution and the emulsion layer side protective layer coating solution were replaced by F-5, F-6, F-7 and F-8, respectively.

The coated amounts (g/m$^2$) of the various compounds of the emulsion layer were as follows:

| | |
|---|---|
| Silver behenate | 5.55 |
| Pigment (C. I. Pigment Blue 60) | 0.036 |
| Polyhalogen compound 1 | 0.12 |
| Polyhalogen compound 2 | 0.37 |
| Phthalazine compound 1 | 0.19 |
| SBR latex | 9.97 |
| Reducing agent 2 | 0.81 |
| Hydrogen bond-forming compound 1 | 0.30 |
| Development accelerator 1 | 0.024 |
| Development accelerator 2 | 0.010 |
| Development accelerator 3 | 0.015 |
| Toning agent 1 | 0.010 |
| Mercapto compound 2 | 0.002 |
| Silver halide (as Ag) | 0.091 |

The chemical structures of the compounds used in the examples are shown below.

Spectral sensitizing dye A

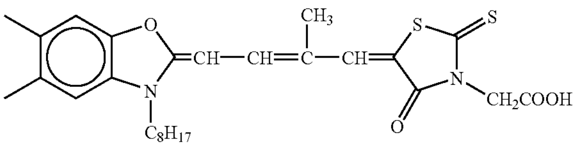

Spectral sensitizing dye B

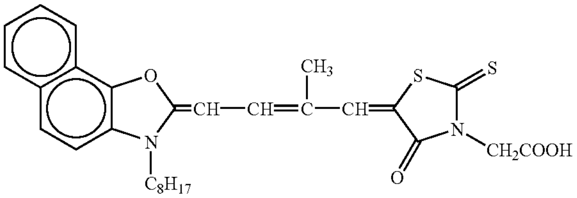

Tellurium sensitizer C

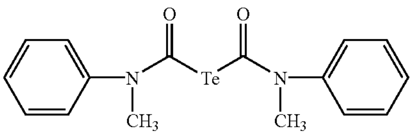

Base precursor compound 1

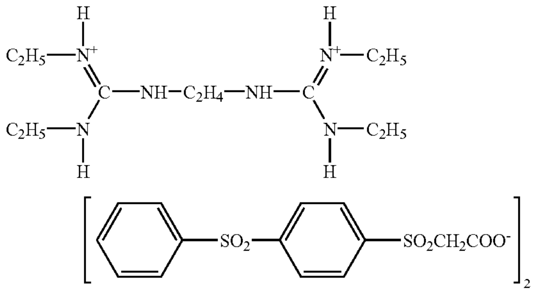

-continued
Cyanine dye compound 1
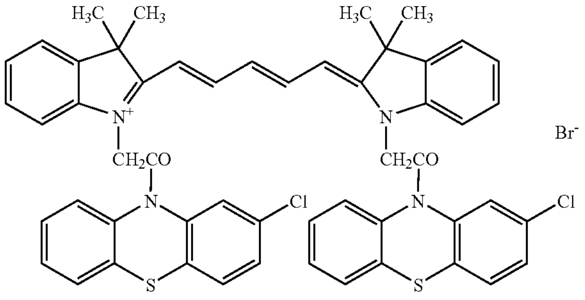
Blue dye compound 1
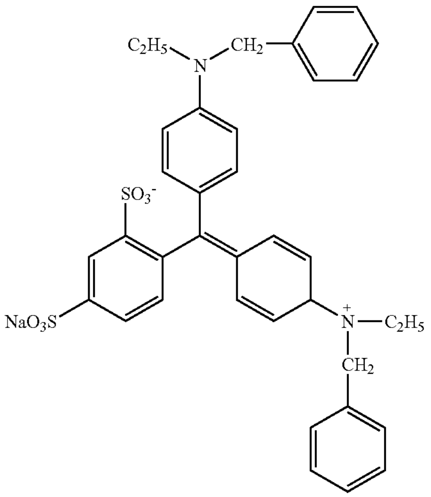
Yellow dye compound 1
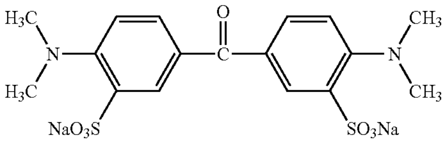
Reducing agent complex 1
1:1 complex of:
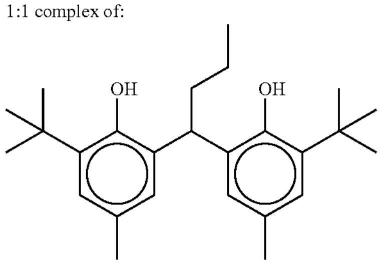
and
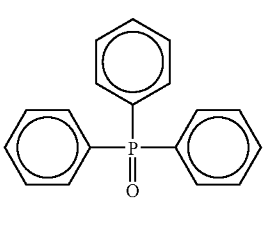
-continued
Reducing agent 2
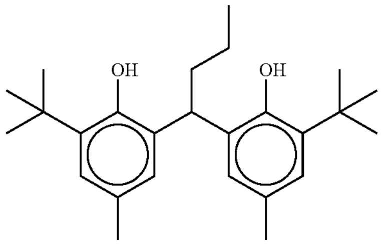
Hydrogen bond-forming compound 1
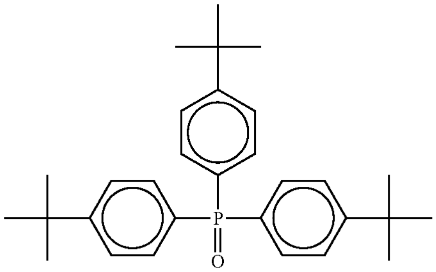
Polyhalogen compound 1
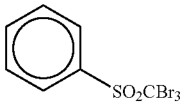
Polyhalogen compound 2
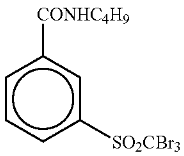
Mercapto compound 1
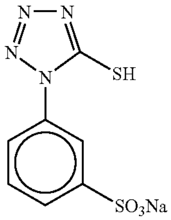
Mercapto compound 2
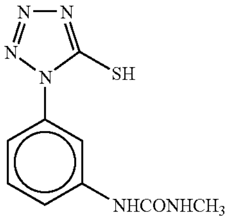
Phthalazine compound 1
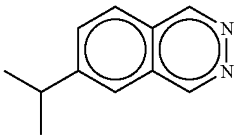

-continued

Development accelerator 1

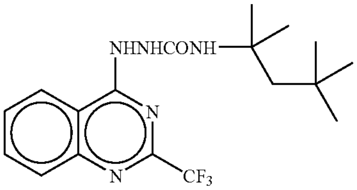

Development accelerator 2

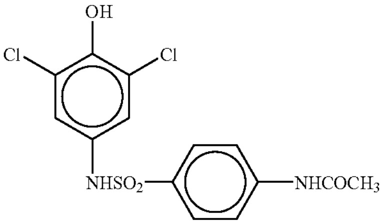

Development accelerator 3

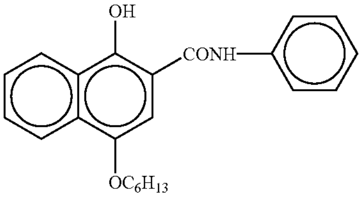

Toning agent 1

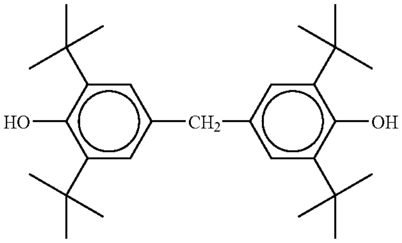

(F-1)

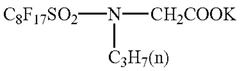

-continued (F-2)

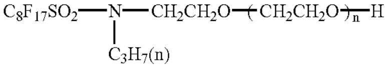

n = 15 (average)

(F-3)

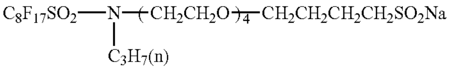

(F-4)

$C_8F_{17}SO_3K$ (F-5)

$CF_3(CF_2)_nCH_2CH_2SCH_2CH_2COOLi$ Mixture of n = 5 to n = 11

(F-6)

$CF_3(CF_2)_nCH_2CH_2O(CH_2CH_2O)_mH$

Mixture of n = 5 to n = 11 and m = 5 to m = 15

(F-7)

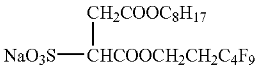

(F-8)

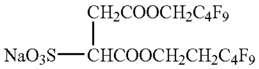

The sample was then subjected to exposure and heat development using Fuji Medical Dry Laser Imager FM-DPL (equipped with a semiconductor laser of 660 nm having a maximum output of 60 mW (IIIB). In more detail, the heat-developable photosensitive materials 1 and 2 were subjected to heat development over four sheets of panel heater the temperature of which had been predetermined to be 112° C., 119° C., 121° C. and 121° C., respectively, for 24 seconds and 14 seconds in total, respectively. The resulting images were evaluated by means of a densitometer.

The heat-developable photosensitive materials 1 and 2 were each subjected to testing free from protective carrier and in combination with protective carriers (1) to (4) as set forth in Table 4 in the same manner as in Example 1. These heat-developable photosensitive materials were evaluated for image preservability, change of optical density, handleability in apparatus and recyclability of used paper in the same manner as in Example 1. The results obtained are set forth in Table 4.

TABLE 4

| Experiment No. | Wrapping material | Heat-developable photosensitive material | Image preservability (ΔDmin) | Change of optical density | Handleability in apparatus | Recyclability of used paper | Remarks |
|---|---|---|---|---|---|---|---|
| 1 | No protective carrier | 1 | 0.03 | 0.02 | P | — | Comparison |
| 2 | No protective carrier | 2 | 0.02 | 0.02 | P | — | " |
| 3 | (1) | 1 | 0.03 | 0.02 | G | E | Invention |
| 4 | " | 2 | 0.02 | 0.02 | G | E | " |
| 5 | (2) | 1 | 0.03 | 0.02 | G | F | " |
| 6 | " | 2 | 0.02 | 0.02 | G | F | " |
| 7 | (3) | 1 | 0.03 | 0.02 | G | F | " |
| 8 | " | 2 | 0.02 | 0.02 | G | F | " |
| 9 | (4) | 1 | 0.02 | 0.01 | G | E | " |
| 10 | " | 2 | 0.01 | 0.01 | G | E | " |

As can be seen in Table 4, the embodiments of implementation of the invention gave good results in image preservability, change of optical density and handleability in apparatus similar to Example 1.

The heat-developable photosensitive material of the invention exhibits excellent image preservability and little change of developed density even stored in the form of wrapped material. The wrapping material for heat-developable photosensitive material of the invention can be easily recycled without using any dedicated disposal facilities.

The entire disclosure of each and every foreign patent application from which the benefit of foreign priority has been claimed in the present application is incorporated herein by reference, as if fully set forth herein.

While the invention has been described in detail and with reference to specific embodiments thereof, it will be apparent to one skilled in the art that various changes and modifications can be made therein without departing from the spirit and scope thereof.

What is claimed is:

1. A method for wrapping a heat-developable photosensitive material, which comprises bending a wrapping material so that the wrapping material is brought into direct contact with at least a part of a heat-developable photosensitive material comprising a photosensitive silver halide, a reducing agent, a binder and a non-photosensitive organic silver salt having a silver behenate content of not lower than 53 mol % provided on one side of a support, and shielding the heat-developable photosensitive material wrapped with the wrapping material in a light shielding moistureproof inner wrapping bag, wherein the wrapping material is a paper and the paper comprises a protective layer comprising an ultraviolet-curing resin provided on the surface thereof coming into contact with the heat-developable photosensitive material.

2. The method for wrapping a heat-developable photosensitive material according to claim 1, wherein the paper is paper made from a virgin pulp.

3. The method for wrapping a heat-developable photosensitive material according to claim 1, wherein the paper comprises a laminate layer formed from a material other than paper provided on at least one side thereof.

4. The method for wrapping a heat-developable photosensitive material according to claim 1, wherein the binder comprises polyvinyl butyral in an amount of from 50 to 100% by weight.

5. The method for wrapping a heat-developable photosensitive material according to claim 1, wherein said binder has a glass transition temperature (Tg) of from 40 to 90° C.

* * * * *